United States Patent
Leigh et al.

(10) Patent No.: US 10,754,476 B2
(45) Date of Patent: Aug. 25, 2020

(54) SYSTEMS AND METHODS FOR ULTRASONIC, MILLIMETER WAVE AND HYBRID SENSING

(71) Applicant: Tactual Labs Co., New York, NY (US)

(72) Inventors: Darren Leigh, Round Hill, VA (US); Kaan Duman, Leesburg, VA (US); Steven Leonard Sanders, New York, NY (US)

(73) Assignee: Tactual Labs Co., New York, NY (US)

( * ) Notice: Subject to any disclaimer, the term of this patent is extended or adjusted under 35 U.S.C. 154(b) by 250 days.

(21) Appl. No.: 15/687,401

(22) Filed: Aug. 25, 2017

(65) Prior Publication Data
US 2018/0129356 A1 May 10, 2018

Related U.S. Application Data

(60) Provisional application No. 62/379,627, filed on Aug. 25, 2016.

(51) Int. Cl.
| | |
|---|---|
| G06F 3/043 | (2006.01) |
| G01S 7/539 | (2006.01) |
| G06F 3/0488 | (2013.01) |
| G01S 13/88 | (2006.01) |
| G01S 7/41 | (2006.01) |
| G01S 15/88 | (2006.01) |
| G01S 13/56 | (2006.01) |
| G01S 15/52 | (2006.01) |

(52) U.S. Cl.
CPC .............. *G06F 3/0436* (2013.01); *G01S 7/41* (2013.01); *G01S 7/415* (2013.01); *G01S 7/539* (2013.01); *G01S 13/88* (2013.01); *G01S 15/88* (2013.01); *G06F 3/043* (2013.01); *G06F 3/04883* (2013.01); *G01S 13/56* (2013.01); *G01S 15/523* (2013.01); *G06F 2203/04108* (2013.01)

(58) Field of Classification Search
CPC ......... G06F 3/0436; G01S 15/88; G01S 7/415
USPC .................................................. 342/107, 179
See application file for complete search history.

(56) References Cited

U.S. PATENT DOCUMENTS

2017/0344230 A1* 11/2017 Tseng ................ H04L 12/40032

* cited by examiner

*Primary Examiner* — Bo Fan
(74) *Attorney, Agent, or Firm* — Adam Landa

(57) ABSTRACT

A close-range motion detector has at least one transmitter, at least one receiver, and at least one more transmitter or receiver. The transmitter(s) transmit, and the receiver(s) receive signals in one of the ultrasonic or mm-wave ranges. Multiple transmitters or receivers are spaced apart from one-another along a plane, and transmission of a signal takes place at a known time. Echos of the signal that bounce of a scatterer are received and digitized during a receive window, and the time-of-flight is determined using CAF. Time scaling may be determined as well, and may be determined using CAF. The determined time-of-flight is used to determine an X-Y-coordinate for the scatterer, and its motion (e.g., velocity) can be determined, which are output. In an embodiment, a such a close-range motion detector can be implemented on the side of a smart-watch, making a virtual writing surface on the back of a user's hand.

6 Claims, 17 Drawing Sheets

Figs. 3A-C
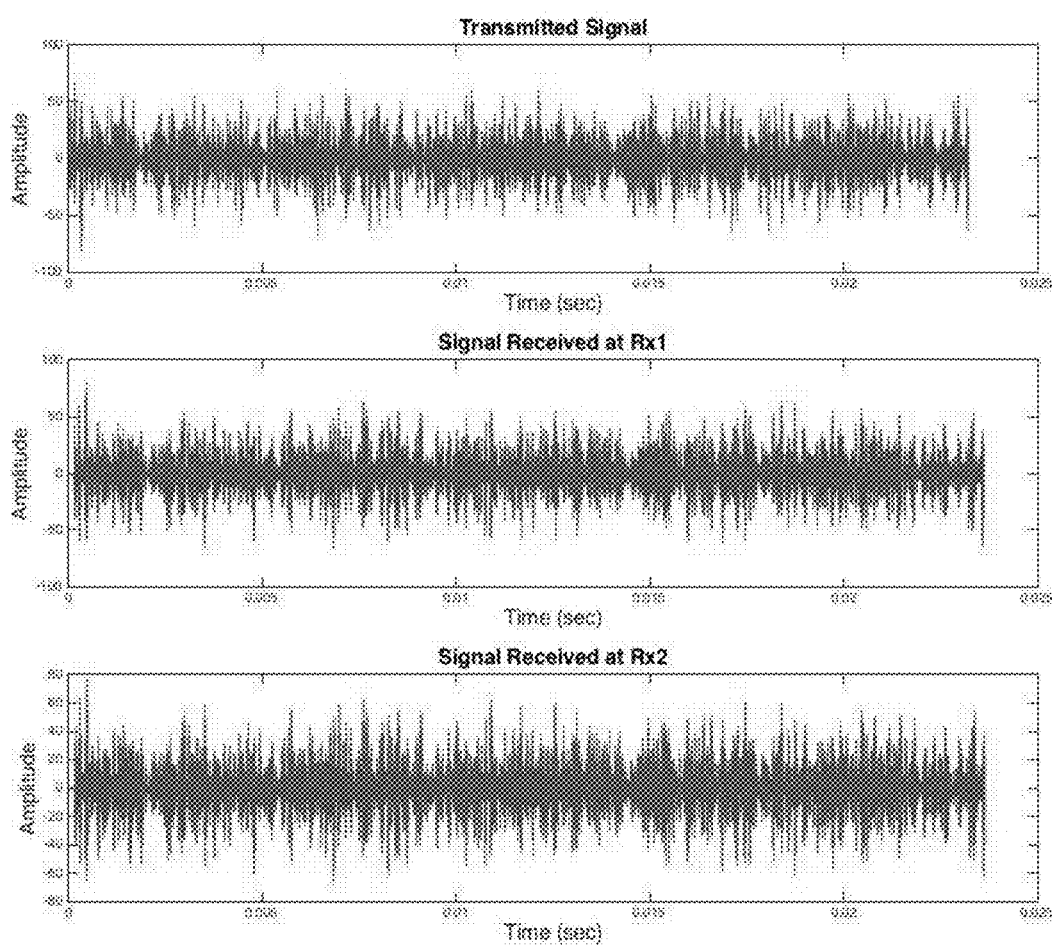

Figs. 4A-C
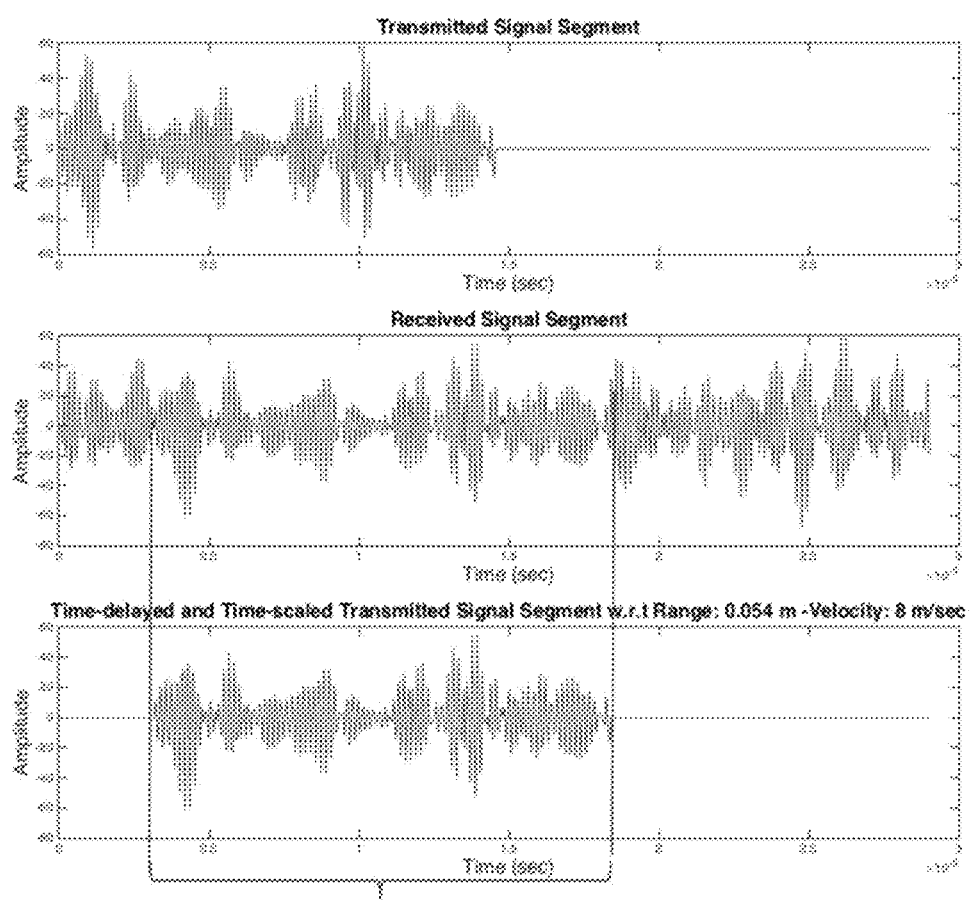

Figs. 5A-J
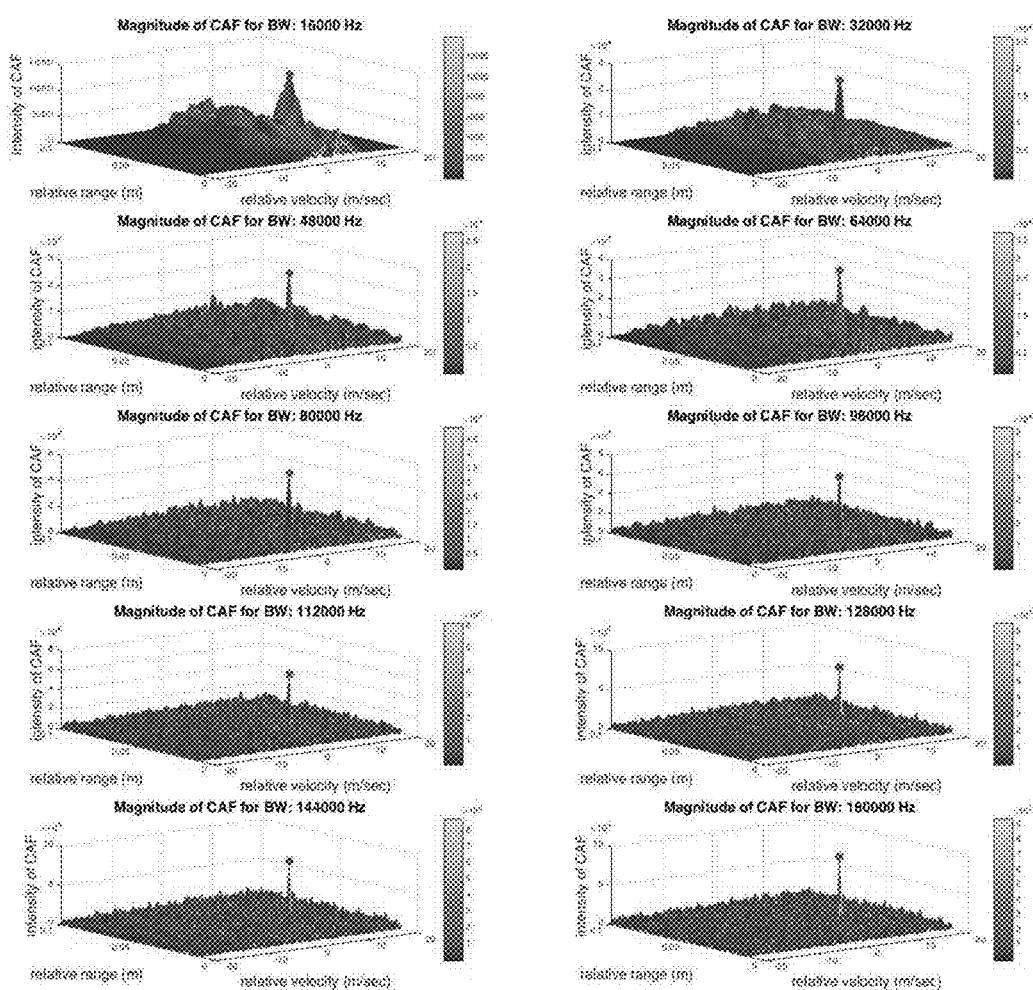

Figs. 6A-J
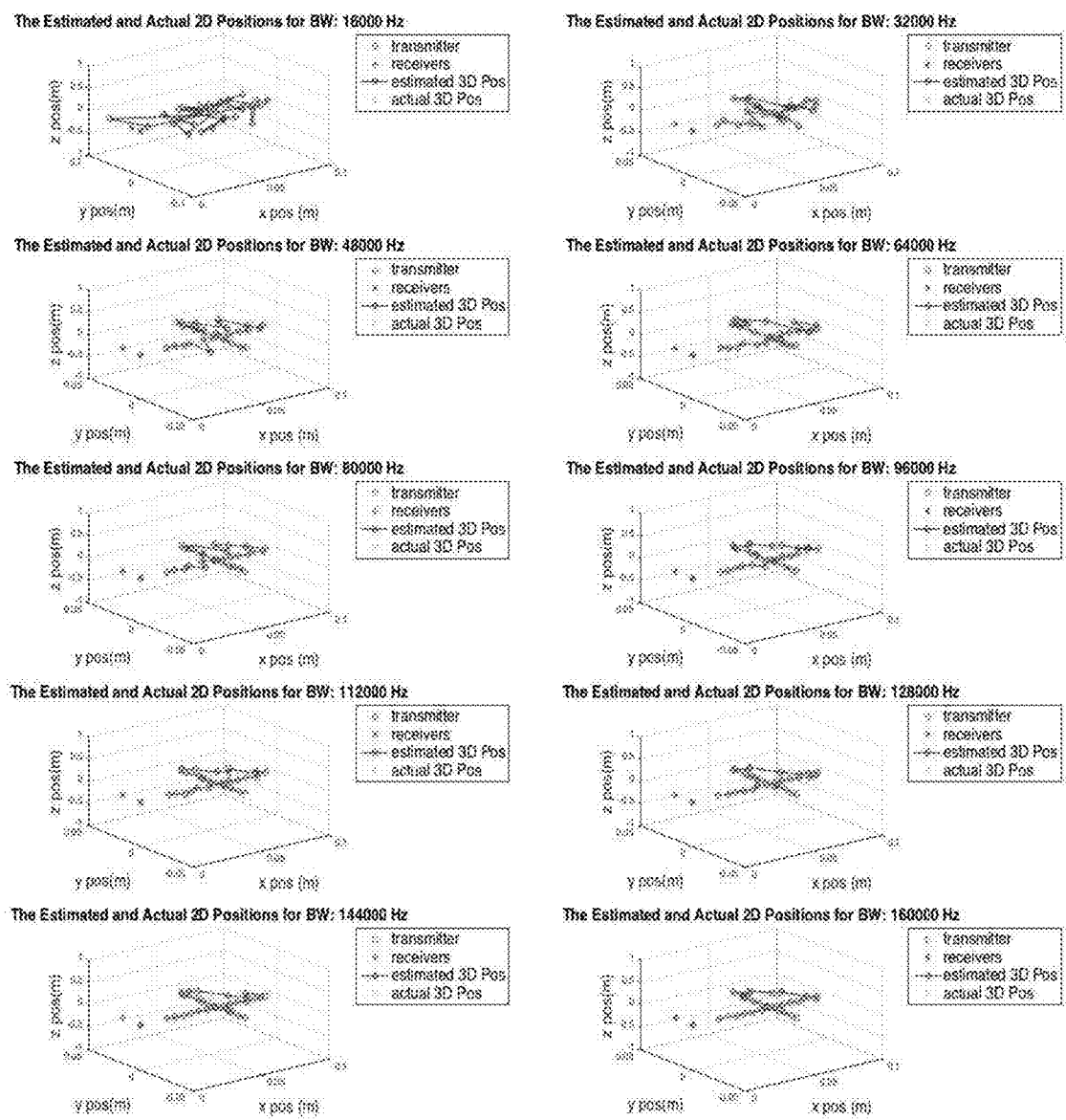

Figs. 7A-J
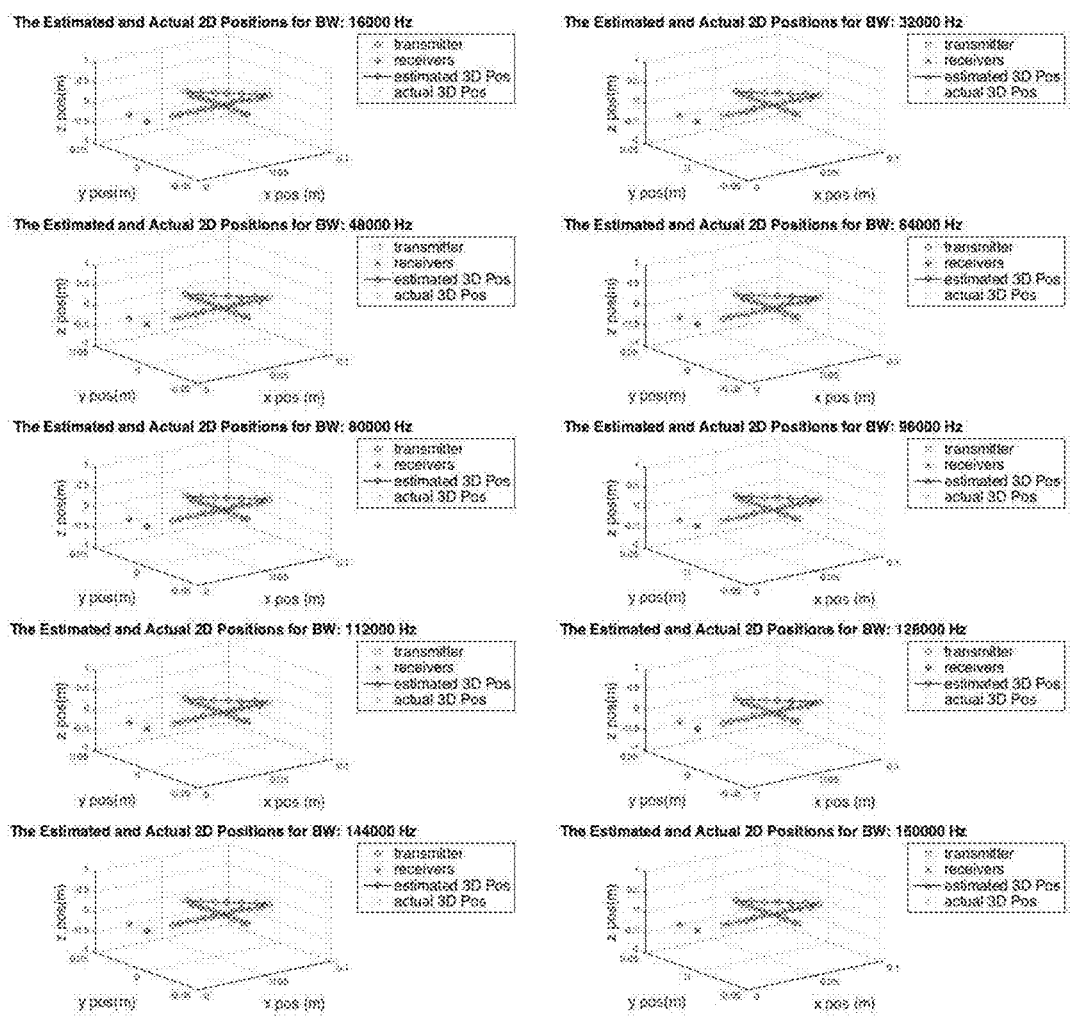

Figs. 8A-D
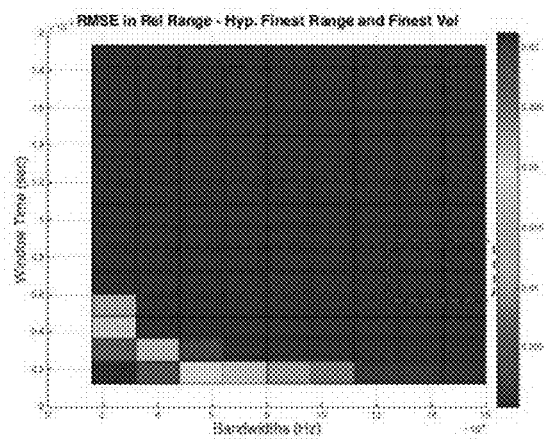
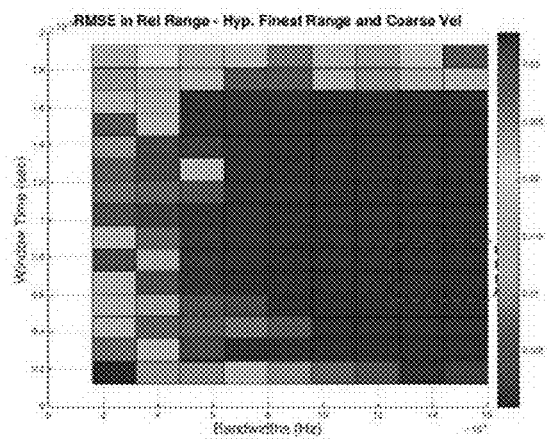
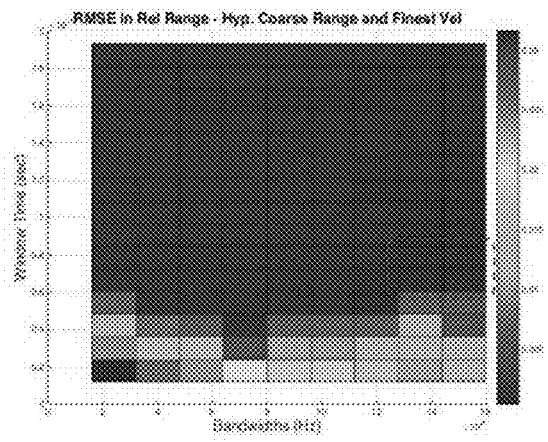
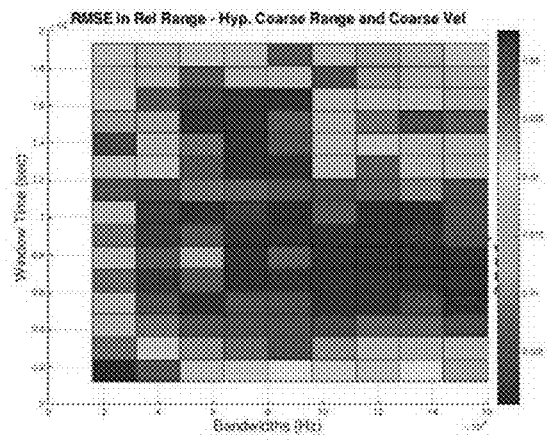

Figs. 9A-D
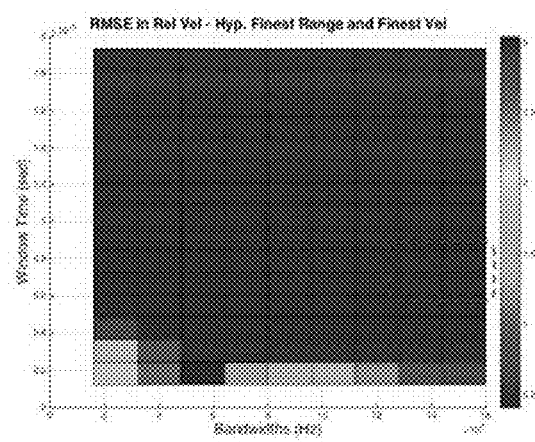
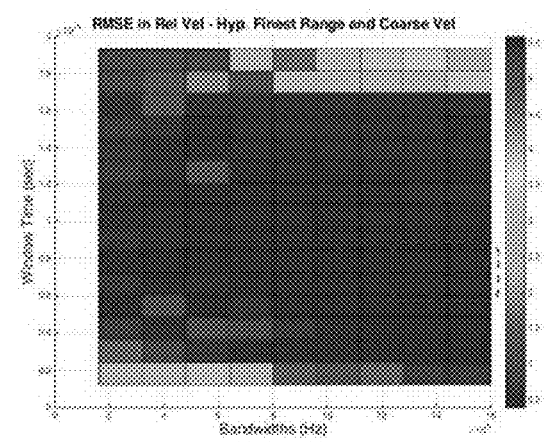
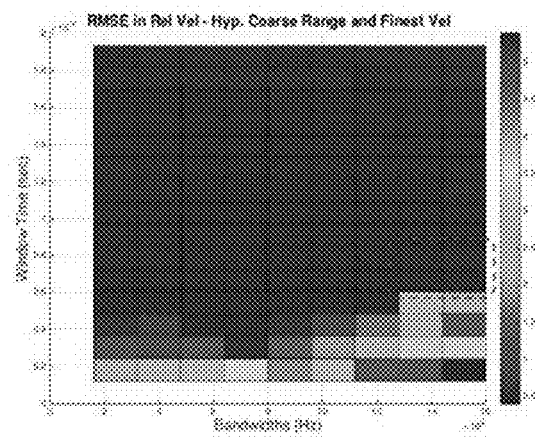
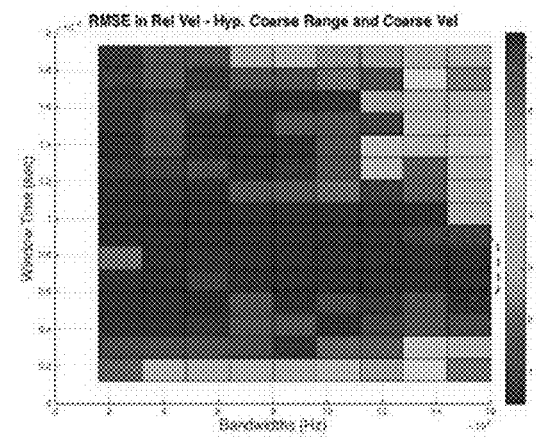

Figs. 14A-B
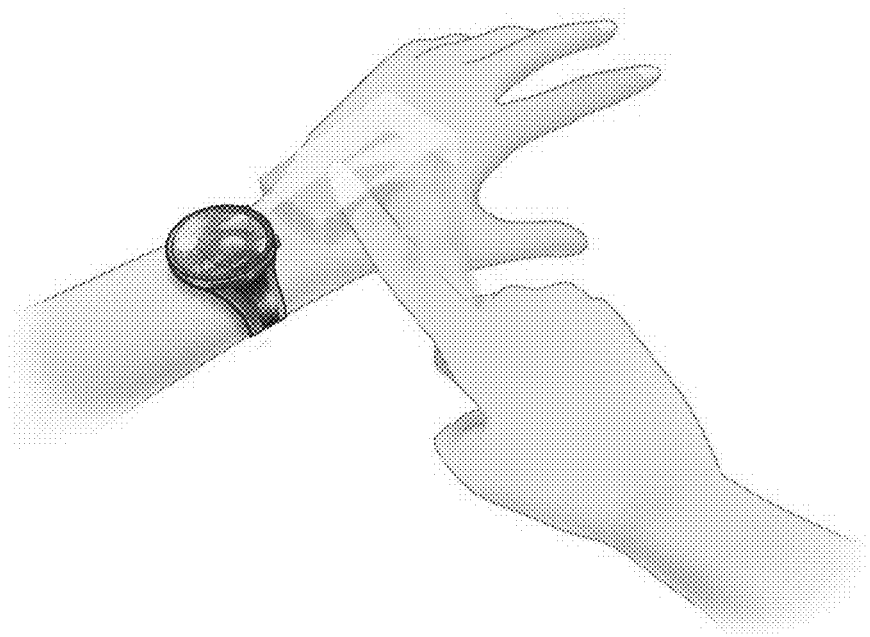
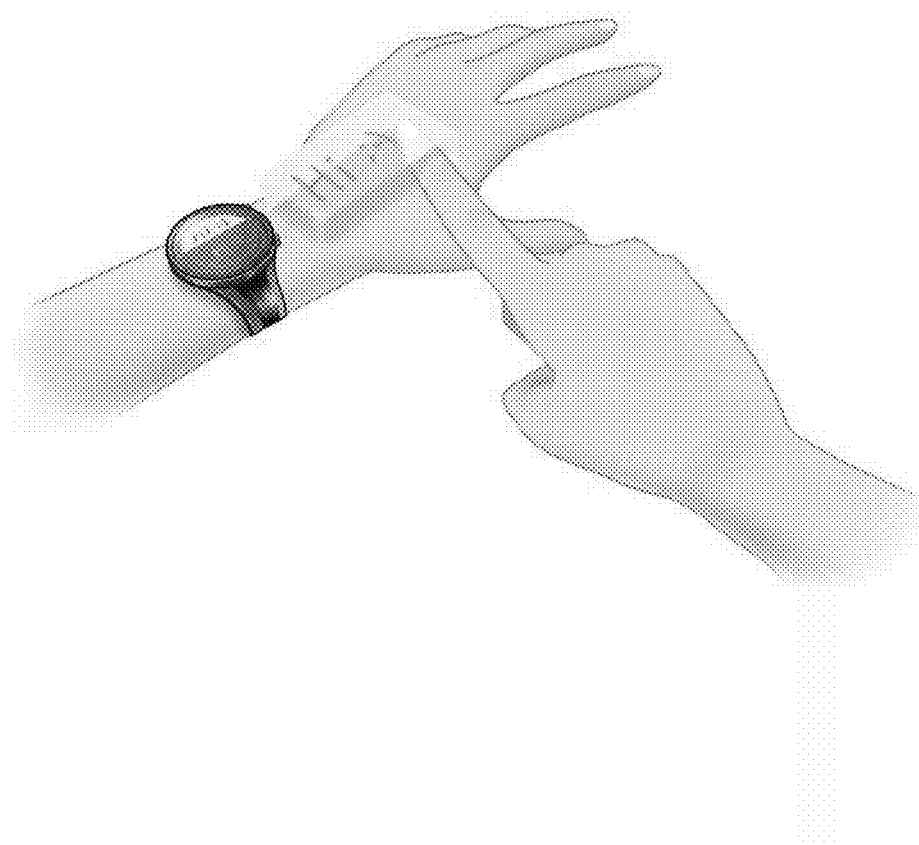

SYSTEMS AND METHODS FOR ULTRASONIC, MILLIMETER WAVE AND HYBRID SENSING

This application is a non-provisional of and claims priority to U.S. Provisional Patent Application No. 62/379,627 file on Aug. 25, 2016 and entitled SYSTEMS AND METHODS FOR ULTRASONIC, MILLIMETER WAVE AND HYBRID SENSING.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed systems and methods relate in general to the field of ultrasonic and millimeter wave sensing, and in particular to a short-range (e.g., 10 cm) sensor array to detect touch in a detection area.

SUMMARY OF THE INVENTIONS

It is an objective to detect various kinds of gestures that will depend on the application in question. Some example gestures might be a finger drawing on the back of a hand, or a hand gesturing above a mobile phone. The gestures could be in one, two or three dimensions (not including the "time" dimension). Detected objects may be in motion or they may be stationary, and detection methods may be able to distinguish stationary targets from moving ones, or may only be able to distinguish moving targets.

BRIEF DESCRIPTION OF THE DRAWINGS

Objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention. Although example embodiments and associated data are disclosed for the purpose of illustrating the invention, other embodiments and associated data will be apparent to a person of skill in the art, in view of this disclosure, without departing from the scope and spirit of the disclosure herein.

FIGS. 3A-C are illustrations of an exemplary transmitted signal and corresponding signals received at two different receivers in connection with an embodiment of the invention.

FIGS. 4A-C illustrates a transmitted signal segment with a window length of 1.5 msec, a received signal segment of 3 msec and an exemplary best match.

FIGS. 5A-J illustrates measurements of CAF for BW at differing bandwidth values.

FIGS. 6A-J illustrates estimated and actual 2-D positions for BW at differing bandwidth values for course hypothetical relative velocity grid in accordance with one embodiment.

FIGS. 7A-J illustrates estimated and actual 2-D positions for BW at differing bandwidth values for fine hypothetical relative velocity grid in accordance with another embodiment.

FIGS. 8A-D shows an embodiment of the RMSE in relative range estimation results for varying window times and bandwidths for combinations of fine and course hypothetical relative range and velocity grids.

FIGS. 9A-D shows another embodiment of the RMSE in relative velocity estimation results for varying window times and bandwidths for combinations of fine and course hypothetical relative range and velocity grids.

FIGS. 14A-B illustrate a use case for a wrist worn device in accordance with one embodiment of the invention.

DETAILED DESCRIPTION

Figure 1:
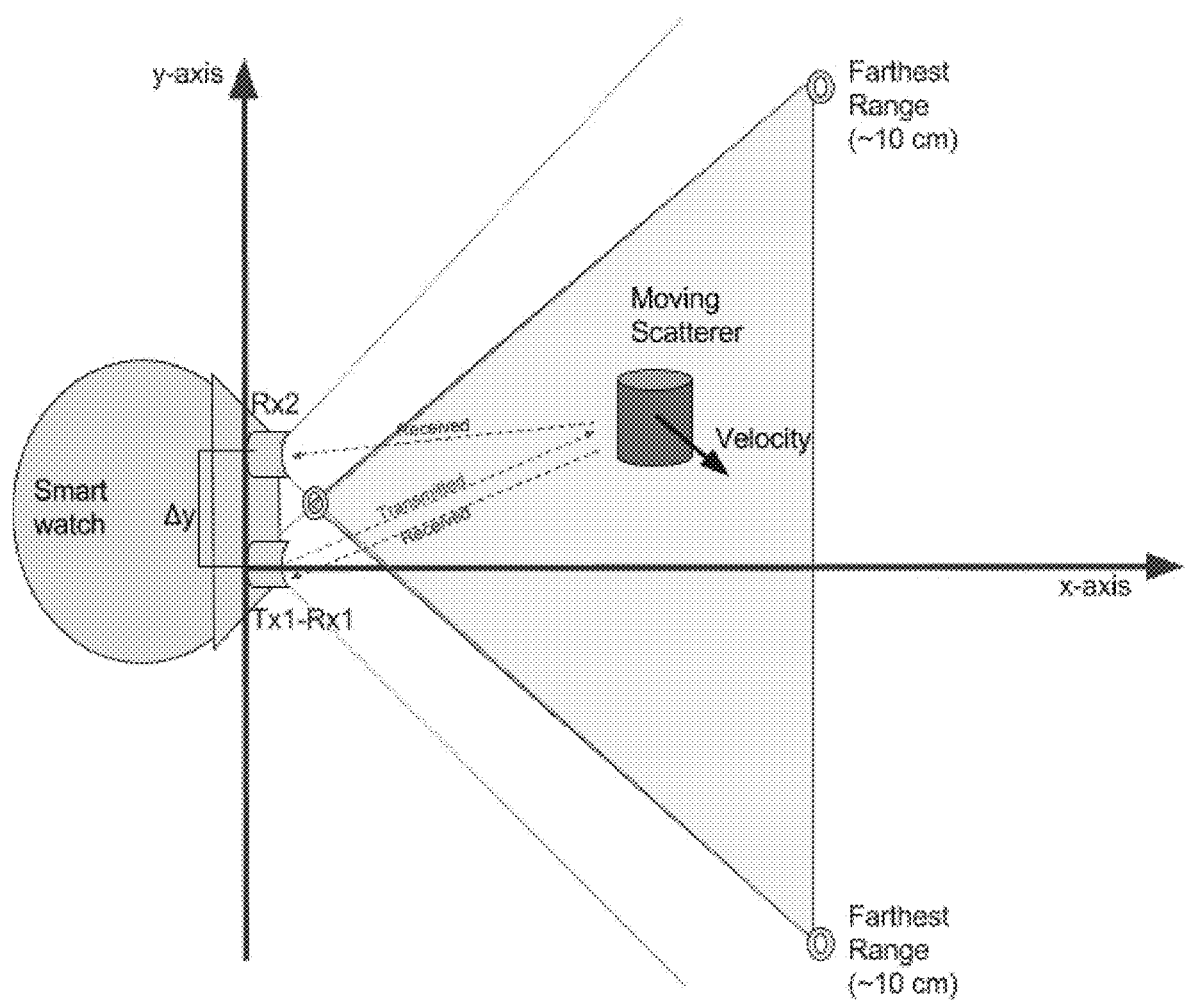
FIG. 1 provides an illustration of an embodiment of signal reception geometry of ultrasonic or millimeter wave (mm-wave) sensors for 2-D position and relative velocity estimation.

The present application contemplates various embodiments of ultrasonic or millimeter-wave technology designed for short-range, human-computer interaction (HCI) applications that are implemented on mobile devices or partially mobile devices. In an embodiment, it is desirable that the technology have the following qualities: high spatial resolution (in an embodiment, on the order of 1 mm of better); low latency (in an embodiment, less than 100 milliseconds, in an embodiment, less than 10 milliseconds, or better); low power (so as not to tax batteries; and small size (so that it can fit in small, portable devices, e.g., watches, mobile phones, wearables, etc.).

In an embodiment, wavelengths are close or nearly the same for ultrasonic frequencies of interest and for millimeter wave RF frequencies. In an embodiment, ultrasonic frequencies may be used. In an embodiment, millimeter wave RF may be used. In an embodiment, a combination of millimeter wave RF and ultrasonic signals with similar waveforms may be used. Because light travels in the neighborhood of one million times faster than sound, RF frequencies that are about a million times the sound frequencies will have the same wavelength and related detection characteristics, thus, in an embodiment, similar emitter/receiver geometry may be used for millimeter wave RF and ultrasonic frequencies. For example, a 60 kHz acoustic waveform and a 60 GHz RF waveform both have a wavelength of about five millimeters.

Thus, embodiments disclosed herein that use ultrasonic waves can be implemented using RF waves and vice versa.

Emitter and Receiver Geometry

The geometry of the emitters and receivers will vary according to the particular application and the spatial and temporal precision required by a particular application. Geometric dilution of precision applies, so in an embodiment, the emitters and receivers will need to be placed in positions that provide an acceptable dilution of precision. In an embodiment, emitters and receivers are placed in monostatic pairs. In an embodiment, emitters and receivers use a distinct frequency, code or time slot per pair. In an embodiment, emitters and receivers are independent (fully multistatic). In an embodiment, a combination of the foregoing emitter and receiver deployments are used.

Signal Structure

In an embodiment, a signal comprised of pulses is used. A signal comprised of pulses (narrow features) in the time domain tends to have excellent range resolution, but poor velocity (i.e. Doppler) resolution. In an embodiment, a signal comprised of signal comprised of narrow features in the frequency domain is used. A signal comprised of narrow features in the frequency domain (e.g. sinusoids) tends to have excellent velocity resolution, but poor range resolution. In an embodiment, a noise-like signal is used. A noise-like signal can have range resolution and velocity resolution that are both excellent.

It has been discovered that range precision (i.e., minimum measurable difference in target range) of a signal deployed in an embodiment of the present invention is proportional to the propagation velocity of the signal and inversely proportional to the signal's bandwidth (BW) and to the square root of its signal-to-noise ratio (SNR). The following formula describes that relationship.

$$r_{prec} \approx \frac{v_p}{BW\sqrt{SNR}} \quad (1)$$

It will be apparent to one of skill in the art that the higher the bandwidth and SNR, and the lower the propagation velocity, the more precisely range is measured.

It has also been discovered that the velocity precision (i.e minimum measurable difference in target velocity) of a signal deployed in an embodiment of the present invention is proportional to the propagation velocity of the signal and inversely proportional to the signal's duration and to the square root of its signal-to-noise ratio. The following formula describes that relationship.

$$v_{prec} \approx \frac{v_p}{T\sqrt{SNR}} \quad (2)$$

In both cases above, the signal-to-noise ratio (SNR) corresponds to power: it is the ratio of the signal power to the noise power.

In an embodiment, precision in both measured range and measured range rate are increased to the extent possible for a given implementation. As used above, precision means having a smaller measurable difference; and measured range rate refers to velocity in the range direction. In an embodiment, precision is achieved by decreasing decrease $r_{pre}$ and $v_{prec}$. In an embodiment, precision can be achieved by decreasing $v_p$, however the propagation velocity is almost always fixed for a particular technology ($v_p=c$ for RF and $v_p$ is the speed of sound for ultrasonics and acoustics). In an embodiment, increasing the SNR will help in both cases, but the benefit only increases with the square root of the amount of power put in and, in many applications, power is limited. In an embodiment, a waveform that is both broadband and has a long time duration allows simultaneous measurement of both the range and range rate (velocity) with good precision. In an embodiment, a noise-like waveform with sufficient bandwidth, transmitted (and received) over a sufficient time period will yield the required precision.

In an embodiment, to achieve a spatial precision on the order of one millimeter without going to a high SNR, the bandwidth is on the order of 300 GHz for radio waves traveling at c, and the bandwidth is on the order of 300 kHz for acoustic waves traveling at the speed of sound. In an embodiment, the center frequency is at least half of the bandwidth. The specific numbers presented for this embodiment are estimates, and are affected by other factors, such as the SNR and the geometry of the transmitter and receiver. In an embodiment, a monostatic geometry is employed, with waves traveling out to a target and the reflection traveling back the same way, the range is essentially doubled so that only half the bandwidth is required.

In some embodiments (including where received noise is independent from the signal, additive, white and Gaussian) a matched filter may be employed. In an embodiment, a matched filter may be optimal or may be the most practical method for recovering the received signal.

Due to the velocity of propagation of the signal and the distance to the target the delay between transmission of a signal and its reception should be measured. In an embodiment, the delay between transmission of a signal and its reception is measured accurately. In an embodiment, the delay between transmission of a signal and its reception is measured as accurately as possible. The Doppler shift of the signal is a metric to measure the relative velocity of the target, i.e. the velocity of the scatterer in the direction of the phase center of the emitter and receiver. Thus, in an embodiment, the Doppler shift of the signal is measured accurately. In an embodiment, the Doppler shift of the signal is measured as accurately as possible. In an embodiment, both the delay and Doppler shift are measured by calculating the cross-ambiguity function (CAF). In an embodiment, the CAF produces a two-dimensional output for each transmitter/receiver pair, the output showing the response of the matched filter for each possible Doppler shift and each possible time shift (delay) that the signal experiences in traveling from the transmitter to the receiver, via any targets. The Doppler shift and time shift correspond to the relative velocities and positions of any targets in the field of view of the transmitter and receiver, and provides information about the relative position and velocity of the transmitter to the receiver (if these are in each other's fields of view).

Synched Data I/O

In an embodiment, a device employs Synched Data I/O (hereinafter TSDIO) which will, in a synchronized manner, send data from a host computer via USB to a set of digital-to-analog converters (DACs). As the DACs output the analog values corresponding to their digital inputs, a set of analog-to-digital converters (ADCs) samples its analog inputs simultaneously, so that the analog samples (both in and out) all occur at the same time and at the same rate. TSDIO will perform rapid-iteration experiments with bidirectional, multistatic ultrasonic sonar systems. In an embodiment, TSDIO will need to be flexible and have adjustable parameters.

In an embodiment, TSDIO may be implemented as a single mixed-signal ASIC. In an embodiment, TSDIO may be implemented as a single circuit board.

In an embodiment, TSDIO may be implemented as two separate circuit boards: a digital board comprised of the USB communication, FPGA glue logic, power supplies and timing circuitry and the DACs and ADCs, and an analog board to perform amplification, level-shifting and general signal conditioning, and is connected to the analog inputs and outputs of the ADCs and DACs. Separating the digital and analog portions (i) enables different analog boards to be easily and quickly designed and fabricated, and (ii) allows the digital portion to be re-used in a wide variety of applications. In an embodiment, the two boards are connected together with an electrically reliable board-to-board connector to allow reliable electrical operation. In an embodiment, the two boards are connected together with a mechanically reliable connection to alleviate mechanical stress on the board-to-board connector. In an embodiment, the two boards are connected together with an electrically and mechanically reliable connector to allow both reliable electrical operation and to alleviate mechanical stress on the board-to-board connector.

USB Communication

In an embodiment, the digital board communicates with a host computer via a wired or wireless communications channel. In an embodiment, the digital board communicates with a host computer employing a standard communication channel such as, USB. In an embodiment, the digital board communicates with a host computer using USB 3.0, e.g., via a Cypress FX3 microcontroller. For wired communications, in an embodiment, the digital board provides some method for strain relief of the cable, e.g., USB cable. In an embodiment, USB bulk or isochronous data transfer will be used. In an embodiment, a facility for appropriate bidirectional control and reporting of status and setup parameters using USB bulk or interrupt transfers is provided. In an embodiment, either or both of the digital and the analog boards can provide a self-identification feature so that a host computer can discover what the board type of connected boards, e.g., model, version, as well as an optional unique serial number for each board instance.

FPGA

In an embodiment, the digital board can use an FPGA as "glue" logic. In an embodiment, FPGA programming can be in Verilog.

DACS

In an embodiment, the TSDIO has at least four digital-to-analog converters (DACs). In an embodiment, the TSDIO has at least eight DACs. In an embodiment, the TSDIO DACs are at least 16-bit, or at least 20-bit. In an embodiment, the TSDIO DACs are 24-bit DACs. In an embodiment, the TSDIO DACs are at least 32-bit. In an embodiment, the DACs convert digital data at the rate necessary to perform as described herein. In an embodiment, the DACs convert digital data at a rate of to at least 5 Msps. In an embodiment, the DACs output samples simultaneously. In an embodiment, the DACs' sample rates are dynamically changeable under program control via USB. In an embodiment, the granularity of the sample rate setting is e.g., 10 kHz, however, generally, a finer sample rate may provide better results other things being equal. In an embodiment, it is possible to specify, under program control (e.g., via USB), that data is to be sent to only a subset of the DACs and that the others should output a default value or another preset value. In an embodiment data is sent to a subset of the DACs (e.g., and have the others output a default or preset value) to trade off DAC speed against the number of simultaneous analog outputs. In an embodiment, data is sent to a subset of the DACs to conserve USB bandwidth.

ADCs

In an embodiment, the TSDIO has at least four, or at least eight, 16-bit or better analog-to-digital converters (ADCs). In an embodiment, ADCs sample their analog inputs at a rate of to at least 5 Msps. In an embodiment, all ADCs sample their inputs simultaneously, and the sample rate may be changed dynamically under program control (e.g., via USB). The granularity of the sample rate setting should be reasonable. In an embodiment, the granularity of the sample rate is no larger than 10 kHz. All other things being equal, finer granularity is better. In an embodiment, data is received from only a subset of the ADCs. In an embodiment, the ADCs from which data is received is specified under program control (e.g., via USB). In an embodiment data is received from a subset of the ADCs to trade off ADC speed against the number of simultaneous analog inputs. In an embodiment, data is sent to a subset of the ADCs to conserve USB bandwidth.

Clocking and Timing

In an embodiment, the TSDIO uses a low-jitter (i.e. low phase noise) clock source. In an embodiment, the TSDIO has provisions for the use of an external clock source. In an embodiment an external, RF-quality phase-locked loop is employed to generate frequencies from the clock source. The PLLs internal to FPGAs are generally not suitable for this application. In an embodiment, multiple TSDIOs are synchronized. In an embodiment, multiple TSDIOs are synchronized by sharing a clock signal. In an embodiment, multiple TSDIOs are synchronized by having a common external clock signal. In an embodiment, multiple TSDIOs are synchronized by having one TSDIO share an internal clock signal with one or more other TDSIOs.

Power Supply

In an embodiment, the TSDIO is powered entirely through the USB port. In an embodiment, alternate power ports are provided for the analog board and analog portions of DACs and ADCs. In an embodiment, alternate power ports are provided for the analog board and analog portions of DACs and ADCs so that they can be powered from bench supplies for testing purposes. In an embodiment, jumpers can be used for switching between power from the USB port and external power. In an embodiment, jumpers can be used for temporary connections. In an embodiment, placement and removal of zero-ohm resistors can be used for switching between power from the USB port and external power. In an embodiment, the zero-ohm resistors are physically large enough that they can be placed or removed manually, e.g., by using hand or by hand using soldering tools. In an embodiment, zero-ohm resistors are not smaller than 0805 SMT parts.

Noise Issues

In an embodiment, the TSDIO employs low noise design and layout techniques. To this end, the design should provide good isolation between the DAC and ADC portions and their downstream connections on the analog board. For all analog supply lines, any power sourced from a DC-DC or other noisy power supply should be followed by a LDO linear regulator. In an embodiment, a low-noise LDO linear regulator is employed.

Synchronization

In an embodiment, the TSDIO board operates in a synchronized manner. When the TSDIO board operates in a synchronized manner it is a relatively simple task to calculate and verify latencies in the system. E.g., ADC sampling is simultaneous with DAC output. In an embodiment, to mitigate noise, DC-DC converters are run at frequencies synchronized to the main system clock.

In an embodiment, data sent to DACs (e.g., through USB) is associated with a timestamp or arbitrary parameter (i.e., a changing/evolving parameter), and data sampled at the ADCs is associated with a timestamp or arbitrary parameter. In an embodiment, the time stamp or parameter may be used as a tag for the ADC data that is sampled at the same moment that the time-stamped DAC data is converted to analog. In an embodiment, associating the ADC and/or DAC with a timestamp or parameter data allows determination (e.g., by software on the host computer) of which samples on the input and output sides occurred at the same time. In an embodiment, associating the ADC and/or DAC data with a timestamp or parameter permits accurate determination of relative timing of sample data.

Analog Board

In a multiple-board embodiment, the analog board may be attached to the digital board via a board-to-board connector, and DAC outputs are routed from the digital board to the analog board. ADC inputs are routed from the analog board to the digital board. It will be apparent to one of skill in the art in view of this disclosure that power supplies are also routed to the analog and/or digital boards as necessary. In an embodiment, either the DAC or ADC analog values (or both) are transmit in differential form one board to the other (e.g., over the board-to-board connector). In an embodiment, voltage references for DACs and ADCs are routed to the analog board. In an embodiment, a digital port (e.g., SPI) is routed between the analog and digital board to allow analog board parameters to be set under program control (e.g., via the USB port).

In an embodiment, the analog board supports the same number of single-ended analog inputs as there are ADC inputs on the digital board. In an embodiment, all have a reasonably high impedance and support at least a 2 MHz analog. In an embodiment, the analog board should support the same number of single-ended analog outputs as there are DAC outputs on the digital board. In an embodiment, all have a reasonably low output impedance and support at least a 2 MHz analog bandwidth. In an embodiment, the input voltage range of the analog inputs is mapped onto the full range of the ADCs. Similarly, in an embodiment, the output voltage range of the analog outputs should be mapped onto the full range of the DACs. Thus, in an embodiment:

Input voltage range settable under program control from 1 volt peak-to-peak to 5 volts peak-to-peak; input impedance no lower than 1 megaohm.

Output voltage range settable under program control from 1 volt peak-to-peak to 12 volts peak to peak; output impedance no higher than 100 ohms.

Construction

In an embodiment, the TSDIO device uses surface mount construction where practical. In an embodiment, a case for the device is optional. In an embodiment, the board set is configured to use rubber feet. In an embodiment, mounting holes for a case may be provided in the board set.

Mechanical Layout

In an embodiment, the TSDIO device is as small as practicable. Generally, the size of the board set is not the highest priority. In an embodiment, the digital and analog boards have facilities for proper mechanical attachment to each other so as not to stress the board-to-board connector.

Test Features

In an embodiment, the TSDIO device employs appropriate test and debugging features including a JTAG chain on the chips that support it. In an embodiment, the boards include test points for ground and the various power supplies and signals that would be useful for debugging.

Driver and Demo Software

In an embodiment, the TSDIO device may be configured to be used on Windows or Linux platforms, or both.

2-D Position and Relative Velocity Estimation Using Ultrasonic Sensors for Close Range Scatterer Motion Recognition Ultrasonic transducers can use sound signals for sensing applications. Typical selected frequencies for ultrasonic transducers are above the hearing limit of humans, from 20 KHz and up to several gigahertz. The higher the frequency the shorter the wavelength; and in sensing applications, the higher the frequency the greater the ability to detect smaller objects. In an embodiment, higher frequency waveforms can be used effectively for short distance sensing without the need of a large transmission power.

Relative range and velocity of a scatterer can be predicted using the transmitted and received waveforms. A scatterer can be any object that reflects a measurable quantity of the transmitted waveforms, in the direction of reception or in a direction that is further reflected in the direction of reception. A transmitting transducer transmits signals that travel at speed of sound. The transmitted signals bounce off scatterers in their range. A receiving transducer collects reflected signals (echoes). By synchronizing the received signals with the transmitted signal, the time delay between the transmission and reception can be determined. The time delay can be used to estimate the scatterer's range relative to the transducers. The received signal stretches or compresses (scales) in time domain with respect to the velocity of the scatterer, which is known as the Doppler effect. In an embodiment, the relative velocity that caused a time scaling effect can be measured by processing the received signal.

More than one receiver is required to determine a coordinate rather than a relative position of a scatterer. In an embodiment, the 2-D position of a scatterer on a flat surface within a short range is determined using at least two receivers and one transmitter.

Turning to FIG. 1, an embodiment of a signal reception geometry is shown. wherein one receiver Rx1 and transmitter Tx1 are collocated and another receiver Rx2 is spaced apart therefrom at a fixed distance along a hypothetical y-axis. Reflections of the transmitted signal may be received by the receivers Rx1 and Rx2, which form a monostatic and bistatic configuration with the transmitter Tx1, respectively. This geometry permits estimation of the 2-D (x-coordinate, y-coordinate) position of the scatter and its radial velocity with respect to the phase center of the transducers. As shown in FIG. 1, the Tx1-Rx1 pair forms a monostatic sensing geometry, whereas Tx1-Rx2 forms a bistatic sensing geometry. Rx2 is separated from Tx1-Rx1 with a distance of $\Delta y$. In an embodiment, transducer Tx1-Rx1 and receiver Rx2 are located on wearable such as a smart watch, and oriented to permit the wrist or back of the hand to operating as a virtual writing surface. Transducer Tx1-Rx1 and receiver Rx2 require separation in the y direction to provide data that can be resolved to a two-dimensional coordinate on the x-y plane. In an embodiment, transducer Tx1-Rx1 and receiver Rx2 are separated by a $\Delta y$ of greater than 1 cm. In an embodiment, transducer Tx1-Rx1 and receiver Rx2 are separated by a $\Delta y$ of greater than 1.5 cm. In an embodiment, transducer Tx1-Rx1 and receiver Rx2 are separated by a $\Delta y$ of 1.706 cm. In an embodiment, transducer Tx1-Rx1 and receiver Rx2 are separated by a $\Delta v$ of not more than 2 cm. In an embodiment, transducer Tx1-Rx1 and receiver Rx2 are separated by a $\Delta y$ of over 2 cm. Higher separation between receivers decreases the margin of error in geometrical calculation to estimate 2-D positions. Thus, in an embodiment, even for a small device such as a watch, a $\Delta y$ of over 2 cm may be used. For larger devices (e.g., tablets), a $\Delta y$ of over substantially more than 2 cm may be used.

For the purposes of discussion herein, a $\Delta y$ of 1.706 cm is from time to time used in the calculations behind estimation e.g., of the relative position and velocity by using the transmitting and received ultrasonic signals. This is for exemplary purposes only, and is not intended to limit the scope of this disclosure, which is intended to be limited only by the appended claims. Simulation results are presented to demonstrate accuracy in 2-D position, relative position and velocity estimation for different sampling frequencies, bandwidths, window time, hypothetical velocity resolution, scatterer position and velocities. Again, the simulation results are illustrative examples only, and are not intended to limit the scope of this disclosure, which is intended to be limited only by the appended claims.

Received Signal Equation

In an illustrative embodiment, the relative range between a moving scatterer and the transducers can be described as follows:

$$R(t)=R_0+vt \text{ and } R(0)=R_0, \qquad (1)$$

where v is the velocity of the scatterer along the look-direction of the transducer, t is the time, and $R_0$ is the initial range of the scatterer t=0.

For a monostatic transducer, i.e., where the transmitter and receiver are collocated, the round trip range (RTR) can be defined for a waveform as $$RTR=cT(t)=2R[t-T(t)/2], \qquad (2)$$

where T(t) is the round trip time (RTT) for the waveform received at time t and which is reflected from the scatterer at time t−T(t)/2. RTT can be solved by plugging in the R(t) in (1) into (2):

$$RTT = T(t) = 2R_0/(c+v) + 2vt/(c+v) = \qquad (3)$$
$$(2R_0/c)/(1+v/c) + 2vt/(c+v) \cong 2R_0/c + 2vt/(c+v)$$

where c is the speed of sound (approx. ~340 m/sec). In an embodiment, the approximation that $2R_0/(c+v) \approx 2R_0/c$ is sufficient for typical scatterer (e.g., finger on the back of a hand) velocities. This also means that $R_0$ points out to the initial range of the scatterer where the waves hit it. Since v is constant and does not depend on time, one assumes that the scatterer does not change during the reflection period. In an embodiment, the reflection period is equal to the time window that transmitter signals are divided to and typically very small, which makes the constant velocity assumption reasonable.

Defining the transmitted signal as s(t), the received signal $S_R(t)$ can be represented in terms of s(t) as follows:

$$S_R(t)=\alpha s(t-T(t))=\alpha s(t(c-v)/(c+v)-2R_0/c), \qquad (4)$$

where $\alpha$ is a complex constant that accounts for the reflection attenuation. Hence, the received signal $S_R(t)$ is the shifted and time-scaled version of the transmitted signal. The shift is also the time delay that determines the range of the scatterer at the time of reflection, and can be denoted with $\tau=2R_0/c$. The time-scaling causes the transmitted signal to rescale in time according to the Doppler stretch factor $\sigma=(c+v)/(c-v)$.

Relative Range and Velocity Estimation

As shown in (4), the received signal is the time scaled, delayed, and attenuated version of the transmitted waveform. Neglecting the attenuation and possible environmental noise added to the received signal, given the range and velocity of the scatterer, an exact match for the received signal can be reconstructed from the transmitted waveform. Thus, in an embodiment, by hypothesizing the range and velocity parameters to synthesize time-delayed and time-scaled versions of the transmitted signal, the relative range and velocity of a scatterer is predicted. In an embodiment, by correlating the hypothesized signals with the received signal, the highest correlation value can be selected as the best match and hence the predicted values for the relative range and velocity to the scatterer. In an embodiment, correlating two signals may be done by multiplying same index values for both signals and adding them up. A two dimensional grid produced by the hypothesized ranges and velocity produces a matrix of correlation values of which the maximum points out to the predicted range and velocity. We refer to this matrix is as a 2-D cross ambiguity function (CAF) and can be formulated as follows:

$$CAF(\sigma, \tau) = \sum_t S_R(t)s(t; \sigma, \tau), \qquad (5)$$

for a number of hypothesized $\sigma$ and $\tau$ values.

In an embodiment, the maximum value of CAF($\sigma$, $\tau$) provides the estimates for $\sigma$ and $\tau$, and consequently the relative range and velocity.

Monostatic and Bistatic Range Calculations

In the sensing scheme shown in FIG. 1, there are two receivers located at different spots, and ranges to be predicted are different for the received signal at Rx1 and Rx2. The range of the scatterer to Rx1 and Rx2 is defined as R1 and R2, respectively. Tx1 and Rx1 form a monostatic configuration because the transmitting and receiving transducers are collocated. Tx1 and Rx2 form a bistatic configuration because the transmitter and receiver are separated. We follow the following steps to estimate R1 and R2:

1. predict the range R1 for the monostatic configuration from time delay $\tau=2R_0/c$.
2. use this range to predict for the range between receiver Rx2 and the scatterer (i.e. R2) by measuring for the time delay $\tau=(R1+R2)/c$.

The estimated relative velocities are the velocities along the look direction of the monostatic and bistatic configuration, which corresponds to the direction from midpoint of the transmitting and receiving transducer to the scatterer of interest.

Determining the 2-D Position of the Scatterer

In an embodiment, after estimating R1 and R2, the triangle formed by R1, R2 and $\Delta y$ in FIG. 1 can be used to determine the 2-D position of the scatterer. In an embodiment, the 2-D position of the scatterer is determined by calculating the interior angles using the cosine rule, and then using these angles and the predicted ranges to pinpoint to the 2-D position of the scatter on the flat surface.

Transmitted Waveform Properties and Factors Affecting the Prediction Accuracy

As an illustrative embodiment (but not intended to limit the generality of the invention), a continuous-wave noise signal is used. In the illustration, a signal is time stamped and divided into windows (defined by a window time). For each window, the transmitted signal is time delayed and scaled. The processed waveforms are used to compute the CAFs for each window time. A description of parameters of the illustrative signal follows:

i. Type of signal: The noise signal provides a unique waveform for every time window in the continuous signal which results in high peaks in the CAF that provides accurate prediction of the range and velocity.

ii. Sampling Frequency: The sampling frequency of the waveform determines the resolution in detecting the edge of the scatterer. Higher sampling frequency provides a finer resolution in time that waveforms hit the scatterer, which leads to better resolution in the determined relative range.

iii. Window time: The continuous wave signal is divided into windows defined by a window time. The individual windowed signals are time delayed and scaled for CAF calculation in order to estimate the relative position and velocities for each window. This window time should be chosen carefully. Generally, it should be long enough to provide a good match for the signal, but also short enough not to cause degradation in the velocity estimation.

iv. Carrier Frequency and Bandwidth: The carrier frequency ($F_c$) of the signal determines the wavelength of the waveform ($\lambda$) with the relation $\lambda=c/F_c$. Wavelength should be smaller than the physical length of the object to be detected. Bandwidth also has an important role in increasing the strength of peaks in the CAF. Generally, increasing the bandwidth also increases the intensity of autocorrelation of the signal, which leads to a sharper peak when the received signal is matched with the processed transmitted signal. In an embodiment, this is also effective in suppression of noise in measurements.

Simulations
Simulation Scenario

Figure 2:
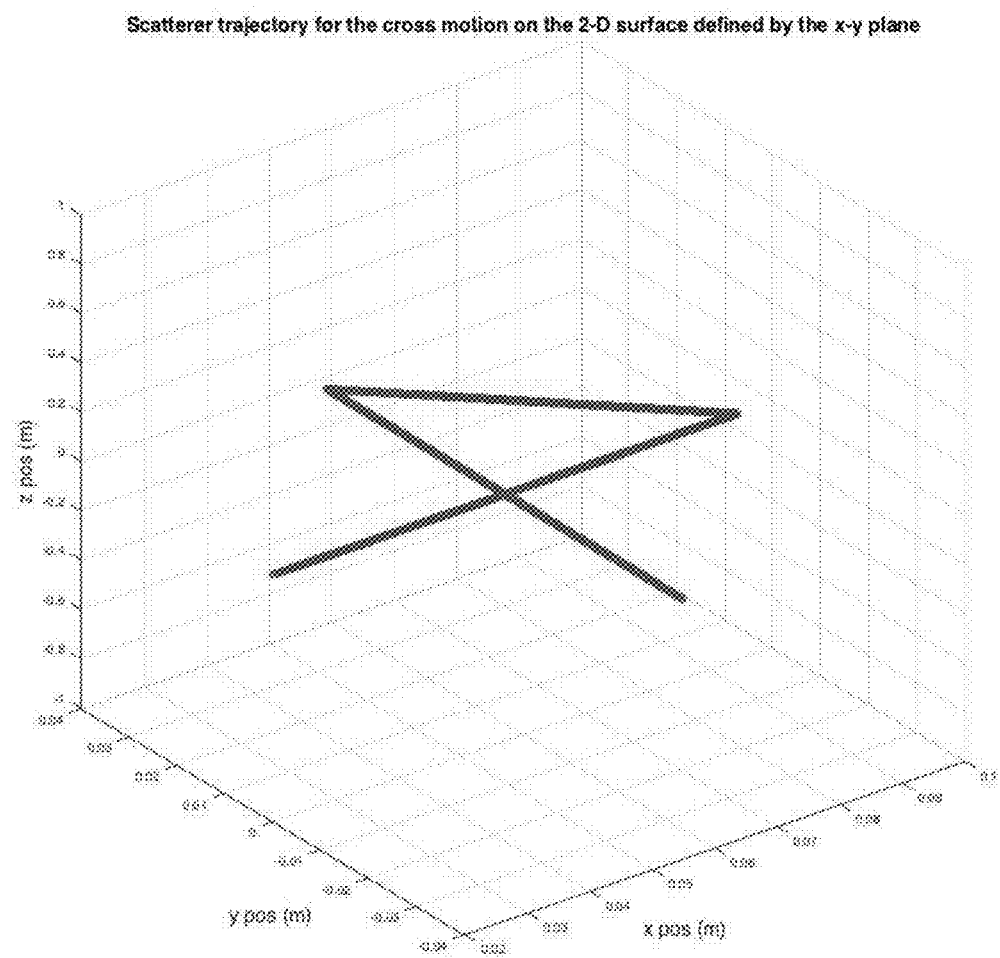
FIG. 2 is an illustration of a trajectory of the scatterer (target) for cross motion on a 2-D surface in connection with one embodiment of the invention.

In initial illustrative simulations, an attempt was made to stimulate a 'cross' motion for a finger which is the scatterer of interest. The 'cross' motion is identified as the scatterer going in horizontal, diagonal and vertical motion, respectively. Turning now to FIG. 2, a scatterer trajectory for cross motion on a 2-D surface is shown. The motion starts from the left-to-right swipe, followed by the diagonal and vertical swipes. Note that the motion is considered to be on a flat surface. The axes are given in meters, and motion considered is within 10 cm range.

Received Signal Generation

In the illustrative simulations, received signals are artificially generated for the moving scatterer. To do this, the transmitted signals are time-delayed and time-scaled according to the position of the scatterer after each time window. Hence the transmitted signal is processed within each time window and recomposed to achieve the full received signal with respect to the positions of Rx1 and Rx2. FIGS. 3A-C show the full transmitted and received signals at Rx1 and Rx2 for $F_s$=176.4 KHz, $F_c$=60 KHz and BW=20 KHz. The total transmission time is 23.2 msec. Because the scatterer is within a very close range at the start of the transmission (~2 cm), the initial delay for received signal is very small. The received signals are delayed and stretched in time differently for Rx1 and Rx2.

2-D CAF Computation

In an embodiment, CAFs are computed according to equation (5) for each window of the signal. The transmitted signal segmented from the time window is time-delayed and time-scaled for a set of values of $\sigma$ and $\tau$. The set of processed windowed transmitted signals are then multiplied element by element in time domain with the received signal. Each $\sigma$ and $\tau$ leads to a value in the CAF of which the maximum points to the predicted relative range and speed. FIGS. 4A-C show the transmitted signal segment a window length of 1.5 msec, and received signal segment for 3 msec starting with the timestamp of the first sample of the transmitted signal. The predicted relative range and speed for the target is 0.054 m and 8 m/sec. Hence the time-delayed and time-scaled transmitted signal according to these values shows the best match with the received signal according to their sample positions.

Role of Bandwidth

FIGS. 5A-J show graphical representations of a CAF map for a signal with $F_s$=1.0584 MHz, $F_c$=360 KHz, and bandwidths between 16 KHz and 160 KHz. Increasing the bandwidth increases the strength of peaks in CAF map. Sharpening the peak or peaks may improve prediction accuracy for ranges and speeds for scatterer measurements that include noise and/or other interference.

Relative Range and Velocity Estimation Results

In an illustrative embodiment, 3 signals with different sampling ($F_s$) and carrier ($F_c$) frequency were used for a set of bandwidth values. The average relative range and velocity error for a set of bandwidths, sampling and carrier frequencies are shown the following Table 1. The results are also shown for the window times of 0.9675 msec, 1.5 msec and 1.9 msec. For CAF calculations, hypothetical ranges are from 1 cm to 10 cm, increasing with 0.1 mm step size. In addition, hypothetical velocities between −20 m/sec and 20 m/sec are used, and the results are shown for step sizes of 0.5 m/sec and also 0.1 m/sec.

TABLE 1

The relative positioning and velocity errors averaged in between bandwidths for signals with different parameters and target velocities

| | | Fs = 176.4 KHz<br>Fc = 60 KHz<br>BW = 2 KHz – 20 KHz | | Fs = 529.2 KHz<br>Fc = 180 KHz<br>BW = 8 KHz – 80 KHz | | Fs = 1.0584 MHz<br>Fc = 360 KHz<br>BW = 16 KHz – 160 KHz |
|---|---|---|---|---|---|---|
| Hypothesized Ranges and Velocities | Errors | Window time = 1.5 msec (256 samples) | Window time = 1.9 msec (1024 samples) | Window time = 0.9675 msec (512 samples) | Window time = 1.9 msec (2048 samples) | Window time = 0.9675 msec (1024 samples) |
| Ranges 0.01:0.0001:0.1 m | Average Relative Position Error | 0.0029 m = 0.29 cm | 0.0107 m = 1.07 cm | 0.0058 m = 0.58 cm | 0.0337 m = 3.37 cm (*) | 0.0054 m = 0.54 cm |
| Velocities −20:0.5:20 m/sec | Average Velocity Error | 0.6646 m/sec | 0.5186 m/sec | 0.4727 m/sec | 2.6316 m/sec (*) | 0.4654 m/sec |

TABLE 1-continued

The relative positioning and velocity errors averaged in between bandwidths for signals with different parameters and target velocities

| Hypothesized Ranges and Velocities | Errors | Fs = 176.4 KHz Fc = 60 KHz BW = 2 KHz – 20 KHz | | Fs = 529.2 KHz Fc = 180 KHz BW = 8 KHz – 80 KHz | | Fs = 1.0584 MHz Fc = 360 KHz BW = 16 KHz – 160 KHz |
|---|---|---|---|---|---|---|
| | | Window time = 1.5 msec (256 samples) | Window time = 1.9 msec (1024 samples) | Window time = 0.9675 msec (512 samples) | Window time = 1.9 msec (2048 samples) | Window time = 0.9675 msec (1024 samples) |
| Ranges 0.01:0.0001:0.1 m | Average Relative Position Error | 0.0021 m = 2.1 mm | 0.00007969 m = 0.08 mm | 0.000092432 m = 0.092 mm | 0.0024 m = 0.24 cm | 0.000038984 m = 0.039 mm (**) |
| Velocities −20:0.1:20 m/sec | Average Velocity Error | 0.6030 m/sec | 0.4522 m/sec | 0.4478 m/sec | 0.4668 m/sec | 0.4215 m/sec (**) |

The Results

The results in Table 1 provide some conclusions on prediction accuracy of relative ranges and velocities with respect to the sampling frequency ($F_s$), step size of the hypothesized velocity and window time (sample numbers). First, it will be apparent to a person of skill in the art in view of this disclosure that prediction accuracy is increased by increasing the sampling frequency and decreasing the step size of the hypothesized velocity. However, increasing the window time does not necessarily point to a better estimation performance, as large number of samples can cause ambiguity in prediction of the relative velocity which leads to an erroneous estimated relative position (see e.g., results marked with (*) in Table 1). In accordance with these observations, better results are achieved for $F_s$=1.0584 MHz, $F_c$=360 KHz, window time=0.9675 m/sec and with 0.1 m/sec step size for hypothetical velocities. These results are marked with (**) in Table 1.

The 2-D position prediction results are also shown for 0.1 m/sec and 0.5 m/sec step size for different bandwidths in FIGS. 6A-J and 7A-J, respectively. For 0.5 m/sec step size, the cross shape is formed in its correct position as the bandwidth increases. For 0.1 m/sec step size, the cross shape is formed in its correct location for all the bandwidth values. FIGS. 6A-J show the estimated and actual position for different bandwidth values ($F_s$=1.0584 MHz, $F_c$=360 KHz, window time=0.9675 m/sec and with 0.5 m/sec step size for hypothetical velocities). The cross motion shape starts to form in its correct position as the bandwidth increases FIGS. 7A-J show the estimated and actual position for different bandwidth values ($F_s$=1.0584 MHz, $F_c$=360 KHz, window time=0.9675 m/sec and with 0.1 m/sec step size for hypothetical velocities). The cross motion shape is formed in its correct location for all the bandwidth values using 0.1 m/sec step size for hypothetical velocities.

In the illustrative simulations Matlab's 'resample' function was used to do the scaling in time for received signal model and processing of transmitted signals to calculate the CAFs. The function downsamples/upsamples the signal followed by a filter smoothing out the output. Accordingly, the result can be regarded as a good approximation for real world received signal measurements. It should be considered that the illustrative simulation results are the result of one realization of noise, however, results can change for each noise signal generation.

Observations

In view of the foregoing, there are several novel contributions to the area of using ultrasonic signals in order to recognize scatterer motion, including:

1. Noise, especially having higher bandwidth, is used as a characteristic signal that leads to sharp peaks in 2-D CAF maps; and
2. 2-D geometry depicted in FIG. 1 is utilized in order to estimate the 2-D position of the scatterer with a minimal requirement of one transmitting and two receiving transducers—the novel geometry and the close range received signal model are described.

In an embodiment, it is desirable to decrease the computational cost of the 2-D CAF calculation. In an embodiment, a two stage (or multi-stage) calculation can be employed, where the stages involve coarse to fine step sizes in hypothetical ranges and velocities. The hypothetical step sizes are very important since they both affect the computational cost and prediction accuracy of the method. In an embodiment, simulations can be carried to determine the best hypothetical values suiting to a particular purpose (e.g., gesture recognition by scatterer positioning and motion sensing).

Parameters for Ultrasonic Sensing of Close Range Scatterer Motion

Above, is described an embodiment of an ultrasonic sensing geometry that provides acquisition of 2-D position and relative velocity of a single point scatterer moving in close range (<10 cm) to the transducers. Below is discussed the selection of the transmitted signal and algorithm parameters for our sensing configuration, including specific investigation of the role of bandwidth, window time, and hypothetical relative range and velocity search grid. In some embodiments, these parameters have an important role in determining the accuracy and computational cost of an embodiment of the disclosed inventive system.

Ultrasonic Sensing Using Pulsed and Continuous Wave

Ultrasonic sensing can be implemented by a pulsed or continuous wave. For pulsed wave, the time between the emission and reception of the pulse bounced off from scatterer (i.e. echo) can be used to predict the distance to the scatterer. The pulse needs to be received to generate the next pulse for next distance measurement. This leads to a wait time which restricts the speed of refreshing the scatterer location. However, continuous wave (CW) measurements do not require a wait time, rather, the scene is illuminated and echoes are received continuously. CW leverages different aspects of the received signal to measure the relative range and velocity to the scatterer. In an embodiment, the transmitted CW is time-stamped with different frequency to determine the range to the scatterer by measuring the time lag between the emissions and echoes. In an embodiment, the attenuation of the received echoes is used to predict the distance to the scatterer. In an embodiment, the CW is utilized to predict the Doppler shift (i.e. relative target velocity) by measuring the frequency shifts between the received and transmitted signals.

An Embodiment of an Ultrasound Sensing System

In an illustrative ultrasound sensing scheme, CW signals are used. The application of CW signals provides benefit from making continuous measurements. In an embodiment, noise signals may be used as the transmitted waveform. Using noise signals as the transmitted waveform creates what can be viewed as a natural time stamp on the transmitted signal because the noise signal is unique for every piece of transmitted signal defined by a window time. Hence for a time window on the transmitted signal, the piece of signal can be regarded as a unique pulse. Similar to pulse wave measurements, the time between the emission and reception of the windowed transmitted noise is measured to predict the relative range to the scatterer. In an embodiment, to predict the relative velocity, the Doppler scale parameter in the received signal is also determined. Hence, in an embodiment, with the aid of noise signals, time-of-flight measurement of the pulsed wave and the Doppler prediction and speed of CW are combined to provide an accurate and fast algorithm for relative range and velocity estimation.

In an embodiment, the scene is continuously illuminated with the transmitted noise signal, and echoes bouncing off a scatterer are continuously received. The received signal is a time-shifted and time-scaled version of the transmitted signal, where the time-shift and time-scale are respectively based on the relative range and velocity of the scatterer. Partitioning the transmitted signals into windows, we can predict the shift and scale for each window time. A set of hypothetical relative ranges and velocities can be used to compute time-scaled and time-shifted versions of the windowed transmitted signal. Correlating each of these with the actual received signal, permits prediction of we predict the relative range and velocity value, e.g., by finding the set with the highest degree of correlation.

Effects of System Parameters in Sensing Accuracy and Computational Cost

Figure 10:
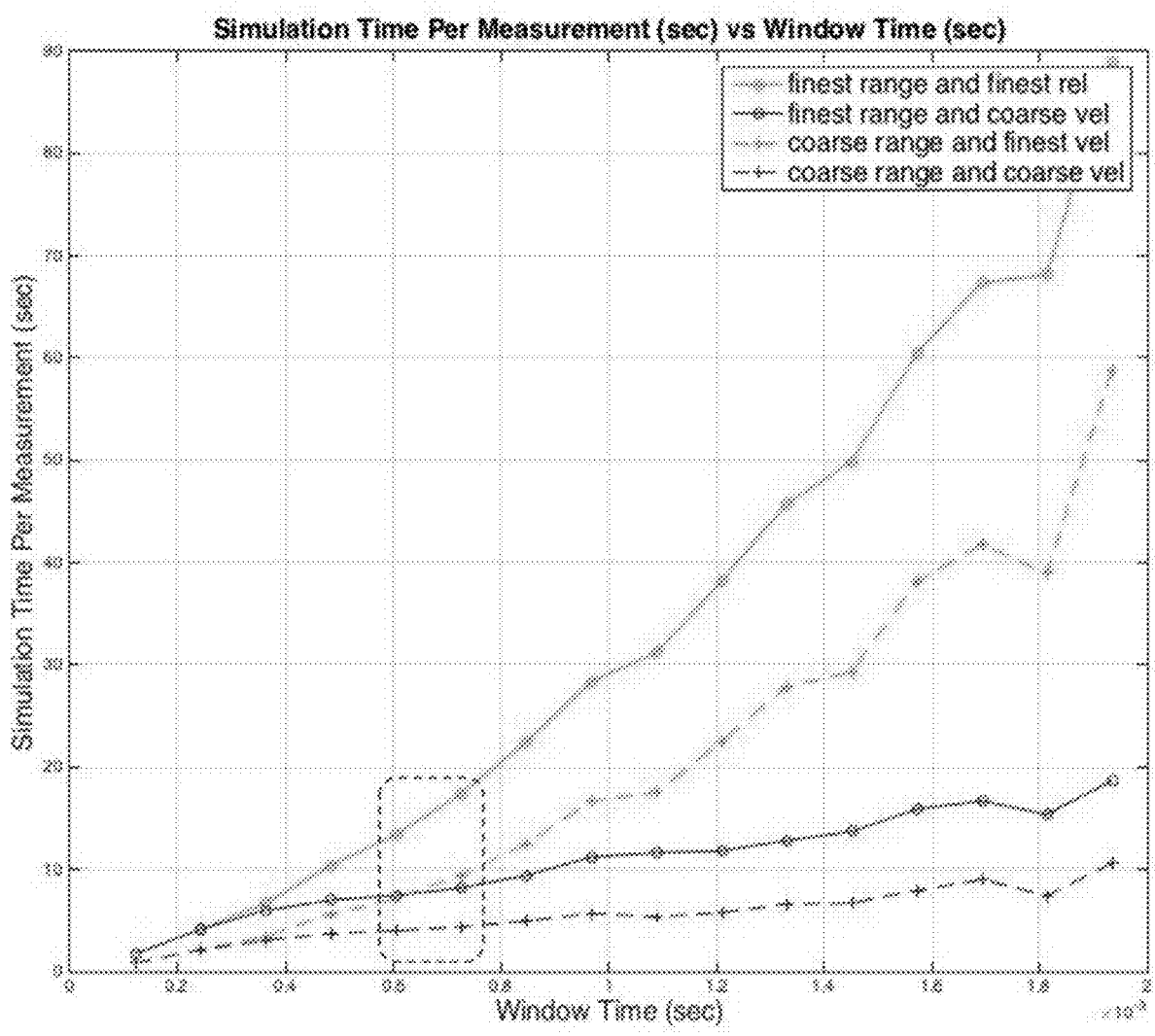
FIG. 10 illustrates simulation time per measurement for varying window times.

The effect of bandwidth, window time and the hypothetical relative range and velocity grid are shown with the simulation results presented in FIGS. 8A-D, 9A-D and 10. FIGS. 8A-D and FIGS. 9A-D show the root mean squared error (RMSE) in relative range and velocity estimation respectively for varying window times and bandwidths. The window times are increased from 0.1 msec up to 1.9 msec. The bandwidths are increased from 16 KHz to 160 KHz. The results for the combinations of fine and coarse hypothetical relative range and velocity grids are shown. FIG. 10 shows the simulation time per measurement (window time) for all of the four combinations. The hypothetical relative range is between 1 cm and 10 cm, with the step size of 0.32 mm and 1.6 mm for fine and coarse grid, respectively. The fine and coarse hypothetical relative velocity is step sized between −20 m/sec and 20 m/sec with the values shown in FIG. 12.

There are several waveform and algorithmic parameters discussed below.

Waveform Parameters

1) Sampling Frequency: This frequency determines the edge detection resolution of the scatterer, specifically given by the formula c/fs, where c is the speed of sound and fs is the sampling frequency. The resolution gets finer with increased sampling frequency. For the illustrative embodiment herein, this frequency is 1.0584 MHz.

2) Carrier Frequency: This frequency determines the wavelength of the signal with the formula c/fc, where c is the speed of sound and fc is the carrier frequency. Higher carrier frequency leads to shorter wavelengths so that the sensing system can detect scatterers of smaller diameters. For the illustrative embodiment herein, this frequency is 360 KHz, which corresponds to a wavelength of 0.942 mm.

3) Bandwidth: Bandwidth defines the frequency band around the carrier frequency and it contributes directly to the characteristic of the generated noise. Higher bandwidth makes the transmitted noise signal to be highly variant in amplitude through time. This makes the measurements more accurate as it allows the correct correlation values to be much higher than others. Besides, it defines the resolution of the sensing as it constitutes as a metric that discriminates between two scatterers present in the scene. The RMSE in relative range and velocity estimation results is provided for different bandwidths and window times in FIGS. 8A-D and 9A-D. As shown in both FIGS. 8A-D and 9A-D, for finest and coarse hypothetical range resolution, in general, higher the bandwidth better the sensing accuracy becomes. However, for coarse hypothetical velocity, the accuracy of sensing is closely related to window time, and has a more complex behavior as further elaborated below.

Algorithmic Parameters

4) Window Time: This parameter defines the time window that the transmitted signal is divided into to be used for computing the correlation values with the received signal. Increasing the window time decreases the number of windows (i.e. the measurements—see FIG. 11) and increase the computational cost (see simulation time per measurement in FIG. 10). However increasing it also increases the resolution of the hypothetical velocity as we have more samples to scale in time (as in FIG. 12, the resolutions (step sizes) coincide up to a window time as there are not enough samples to have a finer velocity resolution). Looking at the simulation results, as expected, we see the window time has similar effect with bandwidth, and hence for finest and coarse hypothetical range resolution, higher window time leads to a better sensing accuracy. However, simulations show that for a coarser hypothetical velocity grid, increasing the window time improves the accuracy up to a point. If increased beyond this point, accuracy degrades. Nonetheless, increasing the window time also increases the computational cost and refresh rate for each measurement. Therefore, the window time should be selected in view of the trade-offs.

Figure 11:
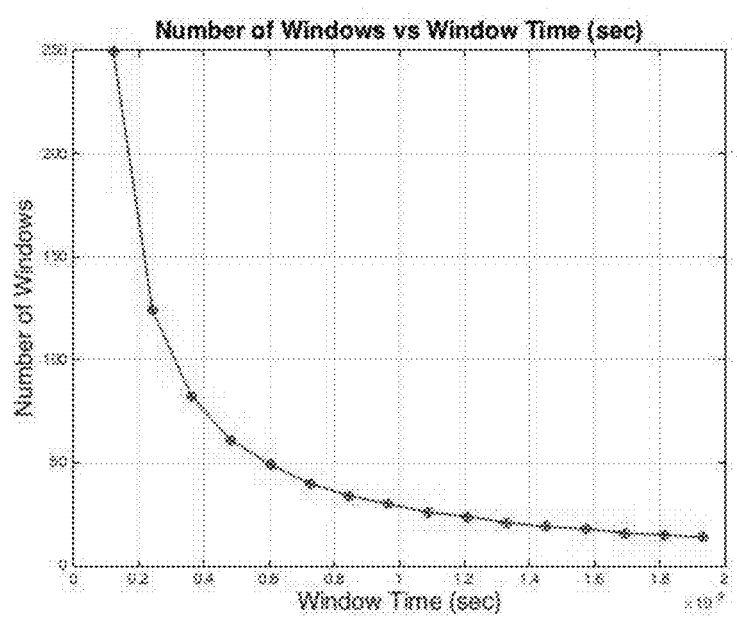
FIG. 11 is a graph showing a relationship between the number of windows (measurements) and window times across hypothetical relative range and velocity grid combinations.
Figure 12:
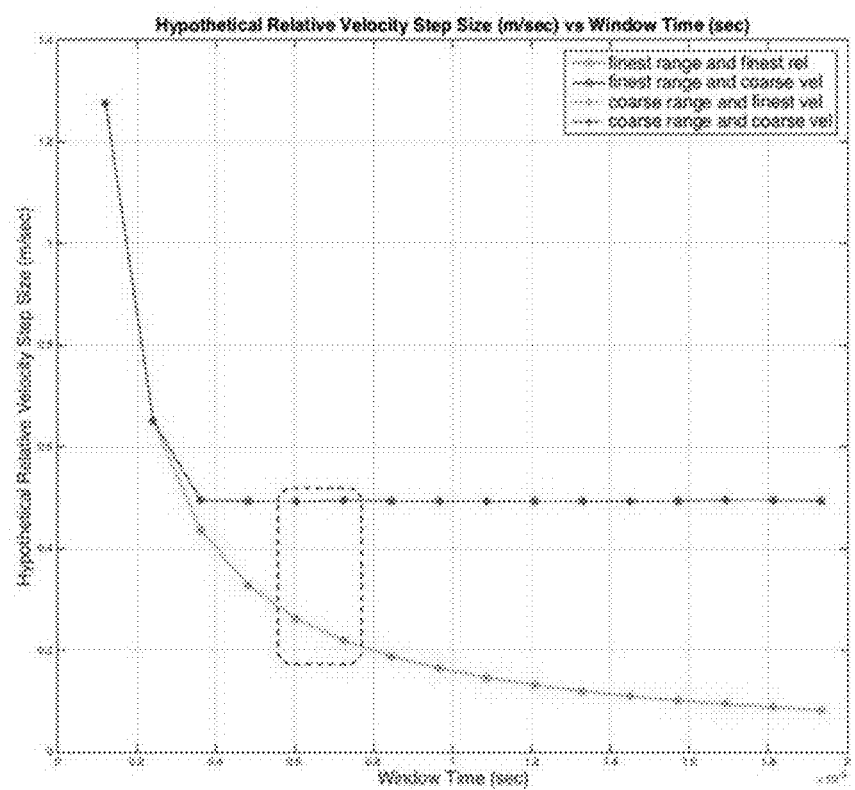
FIG. 12 is a graph showing a relationship hypothetical relative velocity step size for varying window times for combinations of fine and coarse hypothetical relative range and velocity grids.

5) Hypothetical Range and Velocity Grid: This grid defines the resolutions of the hypothetical relative range and velocities to compute the correlation values. As expected, the coarser the resolution, the less the computational cost but also the worse the sensing accuracy becomes. In order to overcome the computational cost without sacrificing the sensing performance, in an embodiment, a two-stage system (or multi-stage system) with a cascaded coarse to fine search grid may be used. However, for this to work efficiently, a region must be found which both coarse and fine values lead to acceptable sensing results. In an embodiment, considering various types of hypothetical grids, a combination of window time and bandwidth is achieved with the region shown with the dotted red rectangle on FIGS. 8A-D, 9A-D, 10 and 12. FIGS. 8A-D and 9A-D show that lowest root mean squared error (RMSE) in relative range and velocity may be achieved in this region for all types of hypothetical relative range and velocity grid. FIG. 10 shows that since the window time is relatively small (0.6-0.7 msec) in this embodiment, the computational cost of producing the estimates is also in an acceptable range and actually similar for the finest and coarsest hypothetical search grids. FIG. 11 shows a number of windows (measurements) for varying window times (sec) for hypothetical relative range and velocity grid combinations. As shown in FIG. 12, the finest hypothetical relative velocity step size in the specified rectangle is very close to its minimum possible value. Notice that as step size decreases, the hypothetical relative velocity resolution increases.

Generally, in FIGS. 8A-D, 9A-D, 10 and 12, the red dotted rectangle shows the region with the best performance for all combinations. While infinite variations are possible, in an embodiment, considering the waveform and algorithmic parameters in terms of the computational cost and sensing accuracy, the following configuration provided the required performance:

Sampling Frequency: 1.0584 MHz
Carrier Frequency: 360 KHz
Wavelength: 0.942 mm
Bandwidth: 144 KHz-160 KHz
Window Time: 0.605-0.726 msec
Initial Measurement Delay: 1.194-1.315 msec
Hypothetical Relative Ran Grid: 0.32-1.6 mm (variable) incremental steps from 1 cm to 10 cm.
Hypothetical Relative Velocity Grid: 0.219-0.5 m/sec (variable) incremental steps from −20 m/sec to 20 m/sec.

The foregoing configuration is intended to be an example, not a limitation. It will be apparent to a person of ordinary skill in the art in view of the disclosure herein that the waveform and algorithmic parameters should be evaluated for a given system, both in terms of the computational cost and the desired sensing accuracy, and that variation from the foregoing is expected from system to system. Note that the illustrated parameters represent one set of possible parameters which were chosen such that: 1) they have similar parameters with the ultrasonic sensors on market (bandwidth having some exceptions addressed below); 2) they perform for the target detection, i.e. they will simultaneously detect 2-D positions in sub-mm level and estimate the relative velocities.

Sampling Frequency($f_s$) and Bandwidth(BW)

As used herein, c0 refers to the speed of transmission in the medium, e.g., the speed of sound for ultrasonics, and the speed of light for mm-wave. Dividing c0 by fs gives the target edge detection resolution. In CAF, the peaks showing the target location move their position with steps of c0/fs. So increasing the sampling frequency decreases the steps and increases the resolution in range. However, the width of the peaks in the CAF are important in determining the exact location of the target. The peaks move in more precise steps in accordance with fs, but the width of the peaks are inversely proportional to bw. So to have sharp peaks at the correct location a larger BW is required.

In an embodiment, 1.0584 MHz>=fs>=340 KHz. Where fs=1.0584 MHz edge detection resolution is about 0.00032 m or 0.32 mm. Higher sampling frequencies may be used, however, for the same window time, using a higher sampling frequency increases the computational complexity. Sub-millimeter edge detection can be achieved using fs=340 KHz. Thus, in an embodiment where sub-millimeter edge detection is required, fs may be between 340 KHz and 1.0584 MHz.

In an embodiment BW is at least 20 KHz. In an embodiment, BW=160 KHz. In an embodiment, BW is at least 160 KHz. At 160 KHz, CAF peak resolution=c0/(2*BW)=1.06 mm, the selected value is the approximate width of the peaks that permits positioning position the target. The maximum point of the peak resides within the 1 mm, which allows identification of the location of the target in sub-mm resolution. Higher BW will achieve better location, however, in the case of commercially available ultrasonic transducers, they typically achieve is around 20 KHz. As higher bandwidth transducers become available (or are made for this application), BW should increase. In an embodiment, using a commercially available common inexpensive transducer, BW is lower than 20 KHz. In the cases where BW is lower than the desired 160 KHz, signal processing approaches are pursued to enhance the peaks in the CAF to increase the target detection resolution to the intended range.

Carrier frequency (fc) determines the wavelength through c0/fc~=1 mm when fc=360 KHz, provided that the target being detected is not shorter than the wavelength—otherwise the waves will 'pass through' and not reflect well. In a finger detection embodiment, 360 KhZ is sufficient. Using an fc lower than around 40 KHz is not recommended because, e.g., a finger can be a little less than 1 cm in width. In an embodiment, room is provided for sufficient bandwidth around fc. In an illustrative embodiment, bw=160 KHz and fs=340 KHz, and 120 KHz>=fc>=50 KHz. A person of ordinary skill in the art will see the relationship and the numerous variations that are within the scope of the invention herein.

Window time and initial measurement delay are algorithmic parameters that can also be controlled. In an embodiment, the window time and initial measurement delay should not change as a result of shifting fc, fs and bw. Nonetheless, the range grid depends on the sampling sampling rate, whereas the velocity grid depends on the sampling rate and the window time. In an embodiment, the minimum for range grid starts from 0.32 mm, which as will be apparent to a person of skill in the art, is directly related to the sub-mm edge detection level. The relative velocity parameter depends on how precise the window can be resized (shrunk or stretched) to find a correct maximum in the CAF—a finer velocity resolution is available with a higher window time and sampling rate.

The illustrative parameters shown above appear to show a sweet spot with currently available ultrasonic transducers when all of the considerations herein are put together. Using available parts, the sensing capabilities can change in an undesirable way if the bandwidth is lowered, or use fc or fs lower than proposed. In an embodiment, the illustrative parameters may represent a best practical scenario for the described target sensing purposes, given the parts that provide these parameters.

In an embodiment, additional signal processing approaches can be pursued if parts have are "worse" fc, BW, etc. As an example, a system using transducers with fc=40 KHz, BW=2 KHz, with sampling frequency set in 200 KHz results as follows: wavelength=c0/fc=8.5 mm; edge detection resolution=c0/fs=1.7 mm; and CAF peak resolution=c0/(2*BW)=8.5 cm. In such an embodiment, the located target is within an 8.5 cm width peak. In an embodiment, interpolation and enveloping the CAF provided a CAF maximum which achieved 1-2 cm resolution.

Although examples herein are illustrated with reference to millimeter wave or ultrasonic embodiments, either may be used for the embodiments disclosed, illustrated and suggested herein.

Smartwatch Application

The sensing array, referred to herein as Reflectar sensor array, comprises either one Ultrasonic/mmWave receiver and two ultrasonic/mmWave transmitters, or one Ultrasonic/mmWave transmitter and two ultrasonic/mmWave receivers. In an embodiment, a transceiver (which includes a co-located ultrasonic/mmWave receiver and ultrasonic/mmWave transmitter) may be used in lieu of one receiver and one transmitter. In an embodiment, a Reflectar sensor array comprises a transceiver (i.e., transmitter and co-located receiver), and a receiver located at a distance from the transceiver. In an embodiment, a Reflectar sensor array comprises a transceiver and and a transmitter located at a distance from the transceiver. In an embodiment, a Reflectar sensor array comprises at least two transceivers (rather than one transceiver and one receiver) located at a distance from each other. In numerous embodiments, additional receivers, transmitters and/or transceivers may be employed. In an embodiment, additional receivers, transmitters and/or transceivers are co-linear, or on the same plane, as the other receivers, transmitters and/or transceivers of the Reflectar sensor array. In an embodiment, additional receivers, transmitters and/or transceivers are non-co-linear, or not on the same plane, as the other receivers, transmitters and/or transceivers of the Reflectar sensor array. The use of an additional non-co-linear receiver, transmitter and/or transceiver may increase resolution in the Z-axis. In an embodiment, the use of an additional non-co-linear receiver, transmitter and/or transceiver can be treated as having each combination having at least one transmitter, at least one receiver and at least one more transmitter or receiver (regardless of whether it is part of a transceiver), as its own Reflectar sensor array.

In an embodiment, a Reflectar array is placed on a side of a smartwatch or other wrist-wearable apparatus such that position and velocity of one or more fingers can be tracked along the X- and Y-axes (and potentially the Z-axis as well), within a short range (e.g., 10 cm) extending parallel to and outwards from the Reflectar sensing array. In an embodiment, Reflectar array can detect differential motion, such as the Doppler effect caused by rotation, which can be used to help detect and distinguish gestures.

Figure 13:
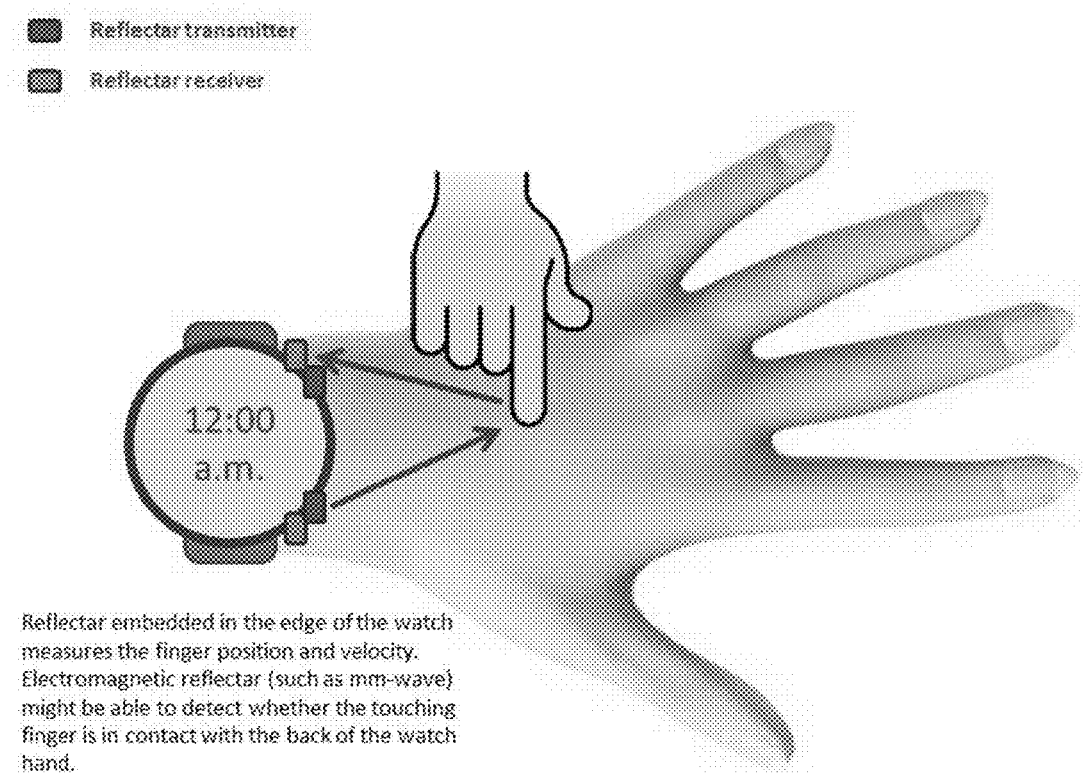
FIG. 13 illustrates transmitters and receivers in a wrist worn device in accordance with one embodiment of the invention.

In an embodiment, when worn on a wrist-worn device with the Reflectar sensor's sensitivity directed toward the hand, the Reflectar sensor array can be used to detect gestures made on the back of one's hand, as illustrated in FIGS. 13 and 14a-b. In an embodiment, a Reflectar array (e.g., on a smartwatch) is used to recognize single finger gestures in the x- and y-plane, such as:

1-finger left-to-right swipe gesture;
1-finger right-to-left swipe gesture;
1-finger top-to-bottom swipe gesture;
1-finger bottom-to-top swipe gesture;
1-finger single tap gesture;
1-finger double tap gesture;
1-finger long single tap gesture; and
1-finger drawing or inking.

In an embodiment, a Reflectar array (e.g., on a smartwatch) is used to recognize single finger gestures in the x- and y-plane, with some z-axis sensing. In an embodiment, a Reflectar array (e.g., on a smartwatch) is used to recognize single finger gestures in the x- and y-plane, with some z-axis sensing, such as:

1-finger left-to-right swipe gesture;
1-finger right-to-left swipe gesture;
1-finger top-to-bottom swipe gesture;
1-finger bottom-to-top swipe gesture;
1-finger single tap gesture;
1-finger double tap gesture;
1-finger long single tap gesture; and
1-finger drawing or inking.

In an embodiment, a Reflectar sensing array is used to recognize multi-finger gestures including but not limited to:

≥2-fingers making a left-to-right swipe gesture;
≥2-fingers making a right-to-left swipe gesture;
≥2-fingers making a top-to-bottom swipe gesture;
>2-fingers making a bottom-to-top swipe gesture;
>2-fingers making a single tap gesture;
>2-fingers making a double tap gesture;
>2-fingers making a long single tap gesture;
>2-fingers moving closer together;
>2-fingers moving further apart; and
>2-fingers drawing or inking.

Figure 15:
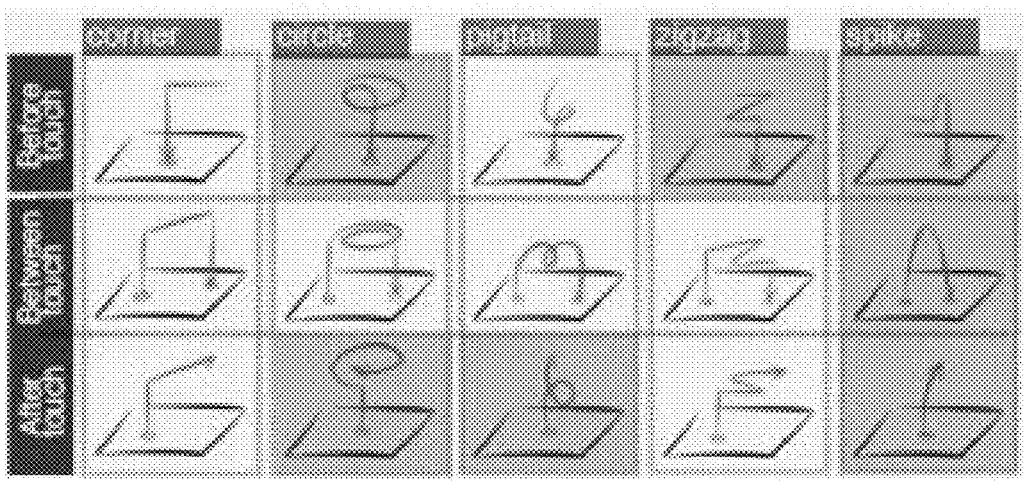
FIG. 15 provides a sample list of in-air gestures that can be deployed in connection with an exemplary embodiment of the invention.

In an embodiment, the Reflectar sensor array is used to detect motions that can be identified as part of a gesture, e.g., computationally. In an embodiment, the Reflectar sensor array is used to detect touch using its sensitivity to the Z-axis. Turning to FIG. 15, in an embodiment, in addition to touch, the Reflectar sensor can detect gestural activity within the sensor range before touch, between touches and after touch. In an embodiment, the Reflectar sensor data can be used to classify gestural activity. In an embodiment, the Reflectar sensor data can be used to classify gestural activity as belonging to one or more categories. In an embodiment, the Reflectar sensor data can be used to classify gestural activity as belonging to one or more of the following categories: corner, circle, pigtail, zig-zag and spike. Other categories and classifications of gestural activity will be apparent to one of skill in the art in view of this disclosure.

In an embodiment, a smartwatch or other computational device receiving data from the Reflectar sensor array can recognize hybrid touch and in-air gestures along the X-, Y-, and Z-axes. In an embodiment, gestures can involve single fingers, or extended objects such as multiple fingers, entire hands, and other appendages. In an embodiment, the differential relative velocity of the object, such as rotation, can be used to better identify and sense the gesturing object and the particular gesture. In an embodiment moments of touch/contact are used as a punctuation mark in gestural vocabularies. Below is presented a sample gestural vocabulary and sample definitions. The samples are intended to provide examples to persons of skill in the art, but are not intended limit the scope of this disclosure or the proposed utilization of the Reflectar sensor array:

In-air "corner" gesture between two touches
    In an embodiment, these hybrid touch and in-air input gestures could be used to select an area between two touch points.
    In an embodiment, these hybrid touch and in-air input gestures could be used to select a text string between two touch points.
    In an embodiment, these hybrid touch and in-air input gestures could be used to multi-select two discrete objects, words, or controls between two touch points.

In-air "corner" gesture after contact
    In an embodiment, these hybrid touch and in-air input gestures can be used to switch the function or state of a touched control after contact.

In-air "circle" gesture before contact
    In an embodiment, these hybrid touch and in-air input gestures could be used to change a control's function quickly between two states by circling clockwise or counterclockwise in-air prior to touching the control.

In-air "circle" gesture between contacts
  In an embodiment, these hybrid touch and in-air input gestures could be used to select an area between two touch points.
  In an embodiment, these hybrid touch and in-air input gestures could be used to select a text string between two touch points.
  In an embodiment, these hybrid touch and in-air input gestures could be used to multi-select two discrete objects, words, or controls between two touch points.

In-air "circle" gesture after contact
  In an embodiment, these hybrid touch and in-air input gestures could be used to move linearly between the selections of a graduated control including but not limited to multi-state buttons, drop downs, dials, or sliders.

In-air "pigtail" gesture between contacts
  In an embodiment, these hybrid touch and in-air input gestures could be used to select an area between two touch points.
  In an embodiment, these hybrid touch and in-air input gestures could be used to select a text string between two touch points.
  In an embodiment, these hybrid touch and in-air input gestures could be used to multi-select two discrete objects, words, or controls between two touch points.

In-air "pigtail" gesture after contact
  In an embodiment, these hybrid touch and in-air input gestures can be used to switch the function or state of a touched control after contact.

In-air "zigzag" gesture between contacts
  In an embodiment, these hybrid touch and in-air input gestures could be used to select an area between two touch points.
  In an embodiment, these hybrid touch and in-air input gestures could be used to select a text string between two touch points.
  In an embodiment, these hybrid touch and in-air input gestures could be used to multi-select two discrete objects, words, or controls between two touch points.

In-air "zigzag" gesture after contact
  In an embodiment, these hybrid touch and in-air input gestures could be used to delete or undo a sequential set of control activations that were just performed prior to sensing an in-air zigzag gesture.
  In an embodiment, these hybrid touch and in-air input gestures could be used to delete or undo a previously selected area of on-screen content or controls.

In-air "spike" gesture before contact
  In an embodiment, these hybrid touch and in-air input gestures could be used as a proxy for the force of a control activation or as a means to quickly toggle between two possible input commands for a given control by gauging if the in-air z-height of a finger's trajectory prior to a control activation was above a certain threshold height or slope.

In-air "spike" gesture between contacts
  In an embodiment, these hybrid touch and in-air input gestures could be used to link two or more discrete controls or text strings together by in-air gestures of a certain slope or height-threshold into a single activation or selection.

In-air "spike" gesture after contact
  In an embodiment, these hybrid touch and in-air input gestures could be used to remove a previously inputted text string.
  In an embodiment, these hybrid touch and in-air input gestures could be used to remove an on-screen control including but not limited to a button, slider, dial, etc.
  In an embodiment, these hybrid touch and in-air input gestures could be used to remove a potential input command among a set of input commands mapped to a given multi-state control by first making contact with a control command presently assigned to a given multi-state control and then performing an in-air spike gesture to remove that option from the multi-state control.

Additional Application

A Reflectar sensing array may be deployed on stationary or mobile devices, such as, for example, laptop computers, tablets, phones, phablets, touch sensors (e.g., touch pads), a computer mouse, cameras, or even a desk or other surface (collectively, Reflectar-enabled devices).

In an embodiment, a Reflectar-enabled device incorporates a Reflectar sensing array consisting of ultrasonic/mmWave transmitters, receiver and/or transceivers integrated within or placed thereon. In an embodiment, a Reflectar sensing array may be placed on the corners or around the periphery of a Reflectar-enabled device so that position and velocity of one or more fingers can be tracked along the X-, Y-, and possibly the Z-axes. In an embodiment, the ultrasonic/mmWave transmitters, receiver and/or transceivers can be placed along the edge, similar to the wearable smartwatch application described above, so that gestures along the side of the Reflectar-enabled device can be detected and recognized. The geometry and sensing issues will be similar.

Figure 16:
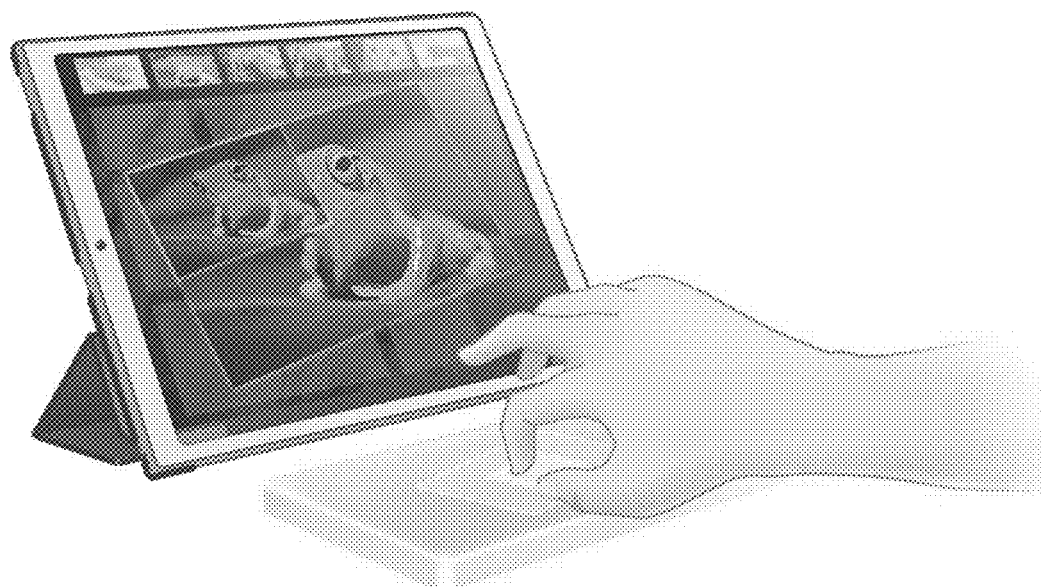
FIG. 16 illustrates another use case in accordance with another embodiment of the invention.

In an embodiment, when deployed on a Reflectar-enabled device, care must be taken to direct the Reflectar sensor's sensitivity toward the relevant area, i.e., the detected area. In an embodiment, one or more In an embodiment, multiple Reflectar sensor arrays may be deployed on a Reflectar-enabled device, permitting multiple, and potentially overlapping areas of sensitivity/detection. Reflectar sensor arrays are deployed on a Reflectar-enabled tablet to provide a virtual work surface as illustrated in FIG. 16. In an embodiment, multiple Reflectar sensor arrays are deployed to extend the virtual work surface shown in FIG. 16. In an embodiment, additional Reflectar sensor arrays are deployed to provide additional areas of gesture detection, such as beside the tablet (not shown), to the tablet shown in FIG. 16. In an embodiment, one or more Reflectar sensor arrays can be used to recognize single finger gestures in the x- and y-plane, with some z-axis sensing, including but not limited to:

1-finger left-to-right swipe gesture;
  1-finger right-to-left swipe gesture;
  1-finger top-to-bottom swipe gesture;
  1-finger bottom-to-top swipe gesture;
  1-finger single tap gesture;
  1-finger double tap gesture;
  1-finger long single tap gesture; and
  1-finger drawing or inking.

In an embodiment, one or more Reflectar sensor arrays can be used to recognize multi-finger gestures in a detection/sensitivity area of a Reflectar-enabled device, including but not limited to:

≥2-fingers making a left-to-right swipe gesture;
≥2-fingers making a right-to-left swipe gesture;
≥2-fingers making a top-to-bottom swipe gesture;
>2-fingers making a bottom-to-top swipe gesture;
>2-fingers making a single tap gesture;
>2-fingers making a double tap gesture;
>2-fingers making a long single tap gesture;
>2-fingers moving closer together;
>2-fingers moving further apart; and
>2-fingers drawing or inking.

In an embodiment, a Reflectar-enabled device (or other computational device receiving data from the Reflectar sensor array) can recognize hybrid touch and in-air gestures along the X-, Y-, and Z-axes. In an embodiment, as described above, gestures can involve single fingers, or extended objects such as multiple fingers, entire hands, and other appendages. In an embodiment, as described above, the differential relative velocity of the object, such as rotation, can be used to better identify and sense the gesturing object and the particular gesture. In an embodiment moments of touch/contact are used as a punctuation mark in gestural vocabularies. Gestures may be classified within a gestural vocabulary and interpreted according to definitions as described above.

Specialized vocabularies can be prepared for various states of, and various types of, Reflectar-enabled device. For example, for a Reflectar-enabled phone, a gestural vocabulary around calls or texts would make sense. Similarly, a Reflectar-enabled phone, may react differently to gestures when it is hand-held versus when it is on a table (or e.g., in a pocket). Similarly, a Reflectar-enabled tablet may have a different gestural vocabulary Head-Mounted Display ("HMD") Applications In an embodiment, a head-mounted display (possibly designed for VR/AR applications) is equipped (as discussed above) with ultrasonic or mm-wave transmitters and receivers so that the relative position and velocity of nearby objects can be measured. In an embodiment, to enhance the resolution of the measurements, the geometry of the TX/RX units can be optimized as discussed above. In an embodiment, for a VR/AR application, the ultrasonic or mm-wave transmitters and receivers are placed around the periphery of the headset such that object in front of the wearer can be sufficiently measured. In an embodiment, the relative position and movement of a hand in front of the headset would be the target of measurement, permitting certain hand gestures to be recognized. In an embodiment, the relative position and movement of a user's fingers and had in front of the headset would be the target of measurement (i.e., having more detailed resolution), permitting further gestures to be recognized. In an embodiment, the Doppler shift is measured and used in calculations (as discussed above) so that gestures involving substantial movement, especially differential velocities (including but not limited to rotation gestures, differential swiping gestures, etc.) are easily distinguished from non-moving object. In an embodiment, the Doppler shift measurements are used to mitigate the effects of radar/sonar clutter.

Hand-Held Controller Based Applications

In an embodiment, a handheld controller, such as a game controller, is equipped (as discussed above) with ultrasonic or mm-wave transmitters and receivers so that the relative position and velocity of nearby objects can be measured in a similar fashion as above. Because such a controller is handheld, the finger position normal to the controller surface of the holding hand will be measurable. In an embodiment, sensors can be placed under the fingers at the controller's grasp points, allowing a height-above-controller-surface measurement. The height-above-controller-surface measurement allows, e.g., "trigger" and other finger gestures to be detected.

Combining HMD and Handheld Applications

In an embodiment, measurements from ultrasonic or mm-wave transmitters and receivers units mounted on an HMD measurements from a handheld controller are combined. Such combined measurement may yield measurements better than can be achieved from either separately. The combination provides an extended sensor geometry, because of the extra sensors and their unique positions. In an embodiment, the relative positions of the HMD and handheld controller should be known. In an embodiment, the relative positions of the HMD and handheld controller can be measured directly e.g., with ultrasound or mm-wave, with a video system or some other RF, optical or acoustic measuring system. In an embodiment, the relative positions of the HMD and handheld controller can be inferred from other sensors, such as inertial and magnetic sensing devices.

Touch and Gesture Surface

Figure 17:
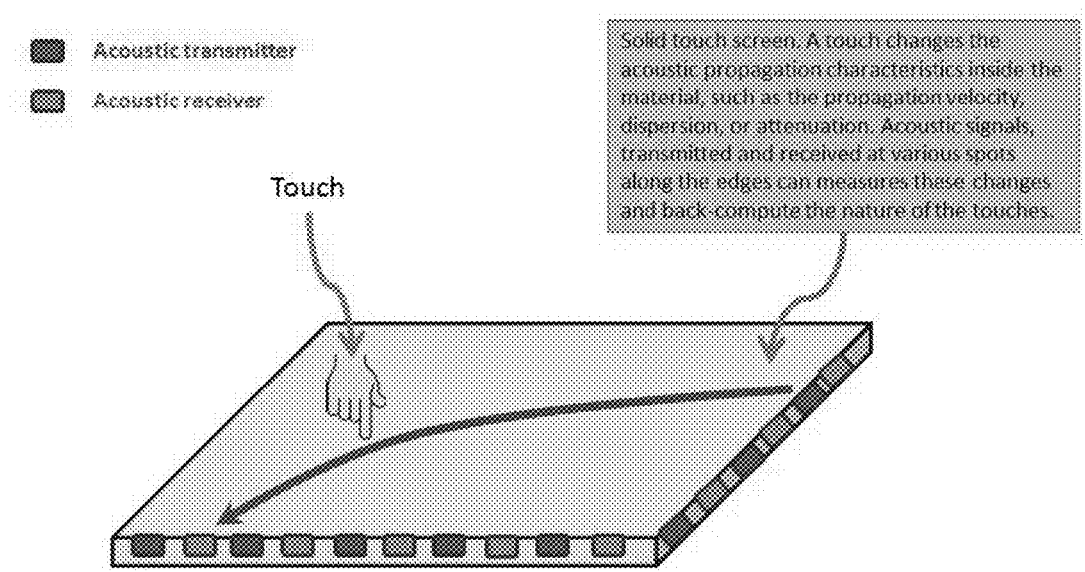
FIG. 17 is a schematic illustration of a touch surface in accordance with an embodiment of the invention.

With reference to FIG. 17, a touch and gestures surface having a plurality of TX and RX units around its periphery is illustrated. A touch gesture surface can be created by placing TX and RX units around the periphery of a two-dimensional waveguide. Note the waveguide can be a two-dimensional manifold of almost arbitrary shape. The TX units send signals into the waveguide and these signals are received and measured by the RX units. In an embodiment, the signals are orthogonal to each other in time, frequency, spread spectrum code, or some combination of these. The signals may be acoustic or electromagnetic in nature.

A touch on the surface of the manifold changes the propagation characteristics of the waveguide so that the received waveforms are changed in some characteristic. In an embodiment, the propagation time of the signals between a TX and an RX unit may change in some manner due to a touch at a particular position on the surface. In an embodiment, the phase of the signals between a TX and an RX unit may change due to a touch at a particular position on the surface. In an embodiment, the amplitude of the signals between a TX and an RX unit may change due to a touch at a particular position on the surface. In an embodiment, the frequency of the signals between a TX and an RX unit may change due to a touch or motion at a particular position on the surface. In an embodiment, the direction of propagation of the signals between a TX and an RX unit may change due to a touch or gesture at a particular location on the surface.

The changes in these signals can be analyzed and, due to the characteristics of the particular waveguide, signals and TX and RX units, along with how touches and gestures will affect the signals, the position of the touch and/or nature of the gesture can be inferred from the signals.

In an embodiment, waveguide is selected based upon how it changes the signals passing through it. In an embodiment, the selected waveguide the material enhance changes to the signals passing through it. In an embodiment, the selected waveguide the material optimizes the changes to the signals passing through it. In an embodiment, a waveguide is selected to optimize the detection and recognition of desired touches and/or gestures. In an embodiment, a waveguide is selected to optimize the detection and recognition of only specific touches and/or gestures. In an embodiment, a waveguide is selected to mitigate the detection and recognition of specific touches and/or gestures. In an embodiment, a waveguide is selected to mitigate propagation of at least some of the signals in the absence of a touch. In an embodiment, the set of signals is selected to optimize the detection and recognition of desired touches and/or gestures. In an embodiment, the set of signals is selected to optimize the detection and recognition of only specific touches and/or gestures. In an embodiment, the set of signals is selected to mitigate the detection and recognition of specific touches and/or gestures. In an embodiment, the set of signals may be chosen to enhance and optimize the changes to the signals passing through the waveguide, to optimize the detection and recognition of touches and gestures.

In an embodiment, a waveguide is fitted with a plurality of transmitters, receivers and/or transceivers along a periphery edge. In an embodiment, the spacing between the components is 5 mm. In an embodiment, the spacing between the components is at least 7 mm. In an embodiment, the spacing between the components is at least 10 mm. In an embodiment, the spacing between the components is no more than 2.5 cm. In an embodiment, at least two transmitters and one receiver are placed on a periphery edge, and at least one transmitter and at least two receivers are placed on another periphery edge. It will be apparent to one of skill in the art, in view of this disclosure, that numerous combinations of receivers and transmitters in various configurations may be used, with the limitation that the transmitters provide signals that can propagate to at least one receiver, but in an embodiment to all receivers in the absence of interaction with the waveguide. It will be similarly apparent to one of skill in the art, in view of this disclosure, that numerous combinations of receivers and transmitters in various configurations may be used, with the limitation that the receivers can acquire signals from at least one transmitter, but in an embodiment, from all transmitters in the absence of interaction with the waveguide.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

We claim:

1. A device for sensing movement of a close-range scatterer comprising:
   clock providing a clock signal;
   transmitter configured to generate a first signal at a known time relative to the clock signal;
   first and second receivers spaced from one-another along a plane, the first and second receivers being adapted to receive echoed portions of the first signal during a receive window occurring during a known period relative to the clock signal;
   signal processor operatively connected to the clock and the echoed portions of the first signal received by the first and second receivers, the signal processor configured to:
   determine, using a CAF, a first and second time-of-flight reflecting the time between the known time of generating the first signal, and the time an echoed portion of the first signal is received by the first and second receivers, and calculating an X- and Y-coordinate on the plane reflecting the X- and Y-location of a scatterer;
   determine a first time scaling reflecting the echoed portions of the first signal received by the first receiver during the receive window, and calculating a movement based on the determined first time scaling;
   determine a second time scaling reflecting the echoed portions of the first signal received by the second receiver during the receive window, and calculating a movement based on the determined second time scaling; and
   outputting an X- and Y-coordinate and movement representing a scatterer from which the first signal was echoed.

2. The device of claim 1, wherein the signal processor is configured to determine a first time scaling, and second time scaling using a CAF.

3. The device of claim 1, wherein the device is a wearable device.

4. The device of claim 3, wherein the device is a wrist-wearable device.

5. The device of claim 1, wherein the first signal is selected from the group of: an ultrasonic signal or a mm-wave signal.

6. The device of claim 1, wherein the first receiver and the transmitter form a transducer.

* * * * *